US010764474B2

(12) United States Patent
Pawar et al.

(10) Patent No.: US 10,764,474 B2
(45) Date of Patent: Sep. 1, 2020

(54) ASSEMBLY FOR ELECTRONIC DEVICES

(71) Applicant: Amazon Technologies, Inc., Seattle, WA (US)

(72) Inventors: Amita Pawar, San Jose, CA (US); Gregory Turner Witmer, Los Gatos, CA (US); Josue Jean Rodriguez, San Jose, CA (US); Maya Ruby Johnson, Pleasant Hill, CA (US); Li Huang, San Jose, CA (US); Prachi Avinash Pant, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 15/633,199

(22) Filed: Jun. 26, 2017

(65) Prior Publication Data

US 2018/0253279 A1 Sep. 6, 2018

Related U.S. Application Data

(60) Provisional application No. 62/466,271, filed on Mar. 2, 2017.

(51) Int. Cl.
*H04N 5/225* (2006.01)
*H04R 1/40* (2006.01)
(Continued)

(52) U.S. Cl.
CPC .......... *H04N 5/2252* (2013.01); *G06F 3/167* (2013.01); *G06K 9/00771* (2013.01);
(Continued)

(58) Field of Classification Search
CPC ....... G06F 3/167; G06K 9/00771; G06T 7/00; G01L 19/00; H04N 5/2252; H04N 5/2254;
(Continued)

(56) References Cited

U.S. PATENT DOCUMENTS 9,485,556 B1 11/2016 List
9,574,762 B1 2/2017 Grillo et al.
(Continued)

FOREIGN PATENT DOCUMENTS

WO WO2016035283 3/2016

OTHER PUBLICATIONS

The PCT Search Report and Written Opinion dated Apr. 18, 2018, for PCT Application No. PCT/US18/18774, 15 pages.

*Primary Examiner* — Nelson D. Hernández Hernández
(74) *Attorney, Agent, or Firm* — Lee & Hayes, P.C.

(57) ABSTRACT

This disclosure describes a voice-controlled electronic device that includes a housing and a mounting component. The housing includes a translucent cover attached to a cylindrical-shaped unibody enclosure. The electronic device further includes a microphone array disposed near a first end within the housing, a speaker box disposed within the housing, and a printed circuit board assembly disposed within the housing. Additionally, the electronic device includes a camera disposed within the housing and attached to the printed circuit board assembly, and a depth sensor that includes a depth camera and a projector. In some instances, the camera and the depth sensor point substantially in a direction of the translucent cover. Furthermore, the electronic device includes a light ring that protrudes from a surface of the translucent display and surrounds a lens of the camera.

20 Claims, 26 Drawing Sheets

(51) Int. Cl.
*H04R 1/02* (2006.01)
*G06F 3/16* (2006.01)
*H04R 3/00* (2006.01)
*H04N 5/33* (2006.01)
*H04N 9/04* (2006.01)
*G06K 9/00* (2006.01)

(52) U.S. Cl.
CPC ............ *H04N 5/2254* (2013.01); *H04N 5/33* (2013.01); *H04N 9/045* (2013.01); *H04R 1/025* (2013.01); *H04R 1/406* (2013.01); *H04R 3/005* (2013.01); H04N 5/2256 (2013.01); H04R 1/028 (2013.01); H04R 2201/401 (2013.01); H04R 2499/11 (2013.01)

(58) Field of Classification Search
CPC ........ H04N 5/2256; H04N 5/33; H04N 9/045; H04R 1/04; H04R 1/406; H04R 1/028; H04R 3/005
See application file for complete search history.

(56) References Cited

U.S. PATENT DOCUMENTS

| | | | |
|---|---|---|---|
| 2004/0001137 A1 | 1/2004 | Cutler et al. | |
| 2005/0275725 A1* | 12/2005 | Olsson | G03B 37/005 348/207.99 |
| 2010/0033427 A1 | 2/2010 | Marks et al. | |
| 2011/0117959 A1* | 5/2011 | Rolston | A46B 7/04 455/556.1 |
| 2015/0279387 A1* | 10/2015 | List | G10L 15/08 704/226 |
| 2017/0026612 A1* | 1/2017 | Rintel | H04N 7/147 |
| 2018/0191879 A1* | 7/2018 | Evans, V | H04M 1/0264 |

\* cited by examiner

ASSEMBLY FOR ELECTRONIC DEVICES

RELATED APPLICATIONS

This application claims priority to U.S. Provisional Application No. 62/466,271, filed on Mar. 2, 2017, the entire contents of which are incorporated herein by reference.

BACKGROUND

Homes are becoming more wired and connected with the proliferation of computing devices, such as desktops, tablets, entertainment systems, and portable communication devices. As computing devices evolve, different ways have been introduced to allow users to interact with these computing devices. For example, users can interact with these computing devices through mechanical means (e.g., keyboards, mice, etc.), touch screens, motion, gesture, or speech.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
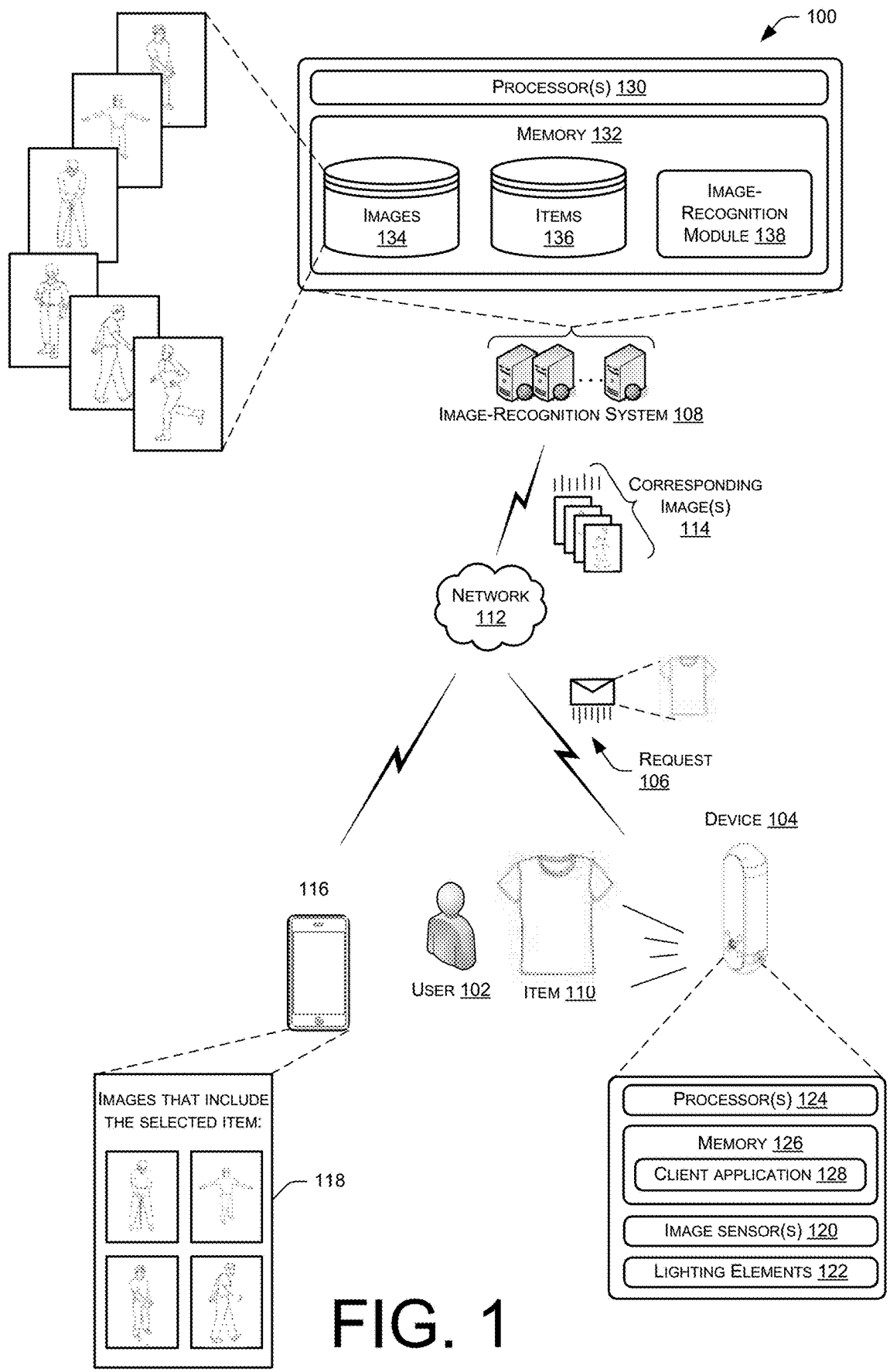
FIG. 1 illustrates an example environment that includes a voice-controlled device capturing an image of a user and then sending a request to an image-recognition system to identify previously captured images that depict a particular item of the user, in this case a particular T-shirt. In response to receiving this request, the image-recognition system compares an image from the request to previously captured images and sends an indication of those images to an electronic device associated with the user.

This disclosure describes, in part, a voice-controlled device that captures images of a user operating the voice-controlled device. The device may then provide the images to an image-recognition service for analysis. In some instances, the remote service may provide a response comprising visual feedback for output to the user, either on the voice-controlled device or on another device. In some instances, the user operates the voice-controlled device through speech and, therefore, the voice-controlled device includes one or more microphones for receiving audible commands from the user. Based on receiving the commands, the voice-controlled device can cause a light assembly, such as a light ring, to provide visual feedback to the user by illuminating one or more lighting elements.

As noted above, the voice-controlled device can capture images depicting the user and send data representing the images to an image-recognition system for analysis. In response, the image-recognition system can send the voice-controlled device and/or an additional electronic device additional data that is based on the captured images. For instance, the image-recognition system can send the additional electronic device data that represents previously captured images of the user based on the image-recognition system identifying the previously captured images based on the analysis.

In some instances, the voice-controlled device may comprise a housing that houses one or more components of the voice-controlled device. The housing may have a longitudinal shape, where a distance along the longitudinal axis is greater than a distance along the horizontal axis. For example, in some instance, the distance along the longitudinal axis can include 133 millimeters and the distance along the horizontal axis can include 42 millimeters (e.g., the housing includes a diameter of 42 millimeters). However, in other instances, the respective distances alone each of the longitudinal axis and the horizontal axis can be greater and/or smaller.

In some instances, a portion of the housing (e.g., a unibody enclosure) may have a substantially uniform cross-sectional shape, such as a circle, square, triangle, or any other polygon. Additionally, in some instances, an additional portion of the housing, such as one of the longitudinal surfaces of the housing, may include a flat cover assembly. In some instances, the cover assembly can be translucent (e.g., such as clear, transparent, etc.) such that one or more image capturing devices located within the housing can capture image data of the user and/or the environment of the device through the housing. For instance, the one or more image capturing devices can be oriented within the housing such that the one or image capturing devices are substantially directed towards the cover assembly.

The one or more image capturing devices can include a depth sensing unit and a camera. In some instances, the depth sensing unit can include an emitter, such as a projector (e.g., infrared projector), and a receiver, such as a camera (infrared camera). The emitter can project light (e.g., infrared light) within an environment in which the voice-controlled device is located and the receiver can capture images of the light for analysis. The camera can include any type of camera that can capture image data (e.g., still image data, video data, etc.) depicting the user. For instance, the camera can include video camera, a still image camera, a red-green-blue (RGB) camera, or the like. In some instances, the camera is disposed on the depth sensing unit, which is positioned within the housing along a longitudinal axis of the housing.

The voice-controlled device can further include a lighting apparatus, such as a light ring, disposed near an outer surface of the housing. In some instances, the lighting apparatus can protrude from the surface of the housing. For instance, the voice-controlled device can include a cover element that protrudes from an outer surface of the cover assembly of the housing. The cover element can be located at a location on the surface such that the cover element blocks light emitted by the voice-controlled electronic device from reflecting off a surface and back into the camera, which can distort the captured images. The lighting apparatus can be disposed within the cover element, such as at the end of the cover element. In some instances, the cover element can include a circular shape and as such, the light assembly can include the light ring located at the end of the cover element.

The voice-controlled device can further include a microphone array disposed near a first end of the housing (e.g., a top end of the housing when the voice-controlled device is oriented longitudinally). The microphone array can include the one or more microphones for capturing the audible commands from the user. For instance, the microphone array can include two or more microphones evenly distributed along the longitudinal axis of the voice-controlled device in order to capture audible commands from all directions. In some instances, since the microphone array is located within the housing, the top end of the housing can include one or more opening (e.g., hole(s)) that allow sound to travel from outside of the housing to the one or more microphones of the microphone array. In some instances, similar to the microphones, the openings can be evenly distributed around the longitudinal axis of the housing.

The voice-controlled device can further include a speaker box disposed within the housing. The speaker box can include one or more speakers to output feedback to the user, such as audible sound. For instance, as discussed above, the voice-controlled device can receive audio commands from the user. The voice-controlled device can then send data representing the audible commands to a system, such as the image-recognition system, for analysis. In response, the voice-controlled device can receive additional data from the system. The additional data can represent sound that the voice-controlled device can output back to the user via the one or more microphones. In some instances, since the one or more microphones are located within the housing, the housing includes one or more openings (e.g., hole(s)) located in proximity to the one or more microphones to allow sound to travel from inside of the housing to outside of the housing.

In some instances, the speaker box is disposed on a midframe assembly within the voice-controlled electronic device. The midframe assembly can include a midframe and a side frame that together create a frame that secures multiple components within the housing. In some instances, the midframe assembly includes an elongated shape, where a distance alone a longitudinal axis is greater than a distance alone a horizontal axis. As such, in such instances, the midframe assembly is disposed within the housing such that the longitudinal axis of the midframe assembly is parallel to the longitudinal axis of the housing.

In some instances, the voice-controlled device can further include a mounting component for attaching the voice-controlled device to a substantially vertical surface, such as a wall, or for placing the voice-controlled on top of a substantially horizontal surface, such as a desk. Since the voice-controlled device can be attached to a substantially vertical service or placed on a substantially horizontal surface, the mounting component can attach to either a surface of the housing that is along the longitudinal axis of the housing or attach to a second end of the housing (e.g., a bottom end of the housing when the voice-controlled device is oriented longitudinally). In some instances, the surface of the housing that is along the longitudinal axis of the housing is located on an opposite side of the housing from the cover assembly.

In some instances, the voice-controlled device can further include one or more lenses attached to the cover assembly, and at least one lighting element that is located within the housing and proximate to a lens of the one or more lenses. For instance, the voice-controlled device may include two light-emitting diodes (LEDs) that are proximate to each of the lenses. Each lighting component can be configured to emit light that travels from within the housing to outside of the housing via a respective lens. In some instances, the lighting elements that emit light via the one or more lenses acts as a flash for the camera when the voice-controlled device is capturing images of the user.

In some instances, the voice-controlled device can further include a transparent component disposed near and/or attached to the cover assembly. For instance, the transparent component can be located at, and include, the portion of the cover assembly that is between the cover element and/or the light ring. In some instances, the transparent component can located in a direction of the camera and, therefore, provide the opening of the cover assembly at which the camera within the housing can captured images of objects (e.g., user) that are located outside of the housing. Additionally, or alternatively, in some instances, the transparent component can include the lens of the camera. In either of the instances, the camera can be oriented within the housing such that the camera is directed substantially towards the transparent component.

In some instances, the voice-controlled device can further include one or more heat dissipating elements. For instances, based on both a size of the housing, and the number of components within the housing, (e.g., image capturing devices, one or more speakers, one or more microphones, light assembly, at least one processor, at least one computer-readable media, printed circuit board(s), etc.), heat generated within the housing can cause problems for the components. As such, the voice-controlled device can include one or more heat dissipating elements that remove the heat from within the housing. In some instances, the one or more heat dissipating elements remove the heat by transferring the heat from within the housing to one or more of the surfaces (e.g., the walls) of the housing.

FIG. 1 illustrates an example environment 100 that includes a user 102 operating an electronic device 104 to send a request 106 to an image-recognition system 108 to identify previously captured images that depict a particular item 110, in this case a particular T-shirt. In response to receiving this request 106, the image-recognition system 108 compares features of the T-shirt to features of several previously captured images and sends, over a network 112, an indication of those images 114 that depict the T-shirt to an additional electronic device 116. In this example, the additional electronic devices 116 displays a GUI 118 illustrating those images that the image-recognition remote system 108 has designated as depicting the particular item 110.

To select the item 110, the user 102 may wear and/or hold the physical item 110 in front of a camera of the electronic device 104, which may capture an image of the item 110. The electronic device 104 may then provide the image of the item 110 to the image-recognition remote system 108, which may either compare features of the image of the item 110 directly to the previously captured images, or may first identify the item 110 from the image and then identify pre-stored features associated with the item 110 for comparing to the previously captured images.

As illustrated, the electronic device 104 may include one or more image sensors 120 (e.g., a still camera, a video camera, a depth camera, etc.), a lighting elements 122, one or more processors 124, and memory 126. The memory 126 may store a client application 128, which the user 102 may use for implementing some or all of the techniques described herein. For instance, the user may use the client application 128 and the image sensor(s) 120 to capture images of items associated with the user, such as clothing items of the user. The electronic device 104 may then store these images locally or may upload the images to the image-recognition system 108. The user 102 may also use the client application 128 to request to view images that depict a particular item, such as the example T-shirt.

As illustrated, the electronic device 104 may couple to the image-recognition system 108 over the network 112. The network 112 may be representative of any type of communication network, including data and/or voice networks, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. Also as illustrated, the image-recognition system 108 may be implemented as one or more servers that, in some instances, form a portion of a network-accessible computing platform implemented as a computing infrastructure of processor(s) 130 and storage (e.g., memory 132) that is accessible via the network 112, such as the Internet. The image-recognition system 108 may not require end-user knowledge of the physical location and configuration of the system that delivers the services. Common expressions associated for the resources of the image-recognition system 108 may include "on-demand computing", "software as a service (SaaS)", "platform computing", "network-accessible platform", "cloud services", "data centers", and so forth.

As illustrated, the memory 132 may store a datastore of one or more images 134, a datastore of one or more items 136, and an image-recognition module 138. The datastore 134 may store images captured depicting one or more users, such as the example user 102. For instance, the user 102 may capture images using the electronic device 104, which may upload these images to the image-recognition system 108 for storage. In some instances, each image is associated with a particular user or user account, such that the images of a particular user are later searchable in response to receiving a request from the corresponding user.

The datastore 136, meanwhile, may store items associated with users, such as the user 102. For instance, the user 102 may capture images using the electronic device 104 of one or more items of the user 102, such as each clothing item in the user's closet (or multiple clothing items from the user's closet). Additionally, or alternatively, the image-recognition system 108 may store indications of items purchased or otherwise obtained by the user 102. For instance, if the user 102 purchases a particular item from a merchant (e.g., from the image-recognition system 108 in some instances), the image-recognition system 108 may store an indication that the user 102 purchased the particular item. By storing indications of these items associated with the user 102, the user 102 is able to select one or more of her items (or multiple ones) to request to view images that depict the item (or the multiple items).

The image-recognition module 138, meanwhile, may utilize a trained neural network, classifier, or other tool to determine whether an image depicts a particular item, as discussed above. For instance, in response to the user 102 providing the request 106 to identify images that contain the item 110, the image-recognition module 138 may compare features of the item 110 to features of a first image to determine whether the first image is sufficiently similar to the item 110 to designate the item. Further, after comparing the first image to the item, the image-recognition module 138 may proceed to do the same for a second image, a third image, and so forth. The image-recognition module 138 may output an indication of one or more images that depict the particular item. For instance, the image-processing module 138 may send, to the electronic device 116, data for displaying the GUI 118. The indication may comprise any other type of visual or audible data in other instances.

Further, while FIG. 1 illustrates certain operations being performed at the image-recognition system 108, in other instances these operations may be performed at the electronic device 104, the electronic device 116, and/or another entity. For instance, the client application 126 may store and execute the image-recognition module 138.

Figure 2:
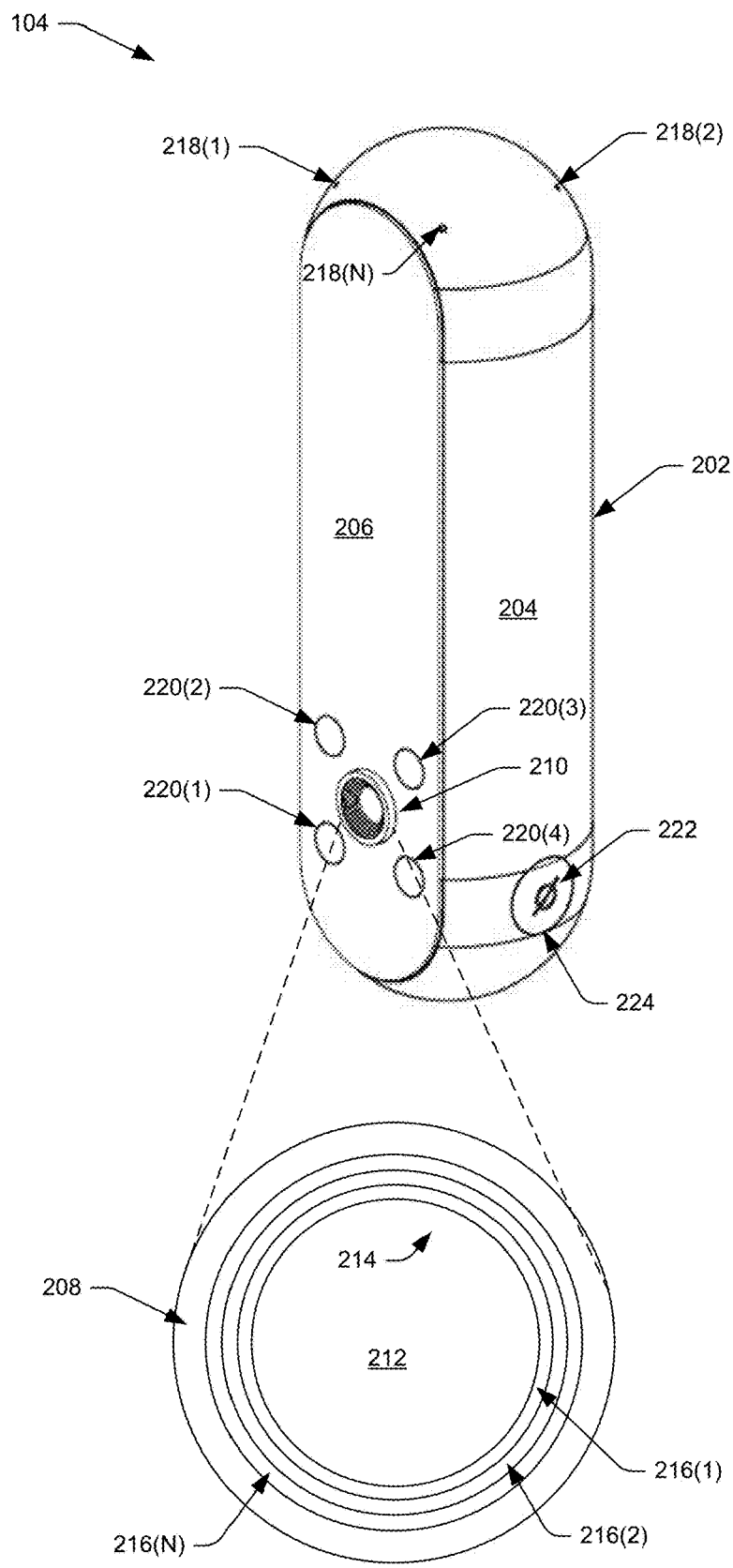
FIG. 2 illustrates an example of an electronic device that captures images of a user and then provides visual feedback to the user in response.

FIG. 2 illustrates an example of an electronic device 104 that captures images of a user and then provides visual feedback to the user in response. As illustrated, the electronic device 104 includes a housing that houses one or more components of the electronic device 104. The housing 202 may include a longitudinal (e.g., cylindrical) shape, where a distance along the longitudinal axis is greater than a distance along the horizontal axis. For example, in some instance, the distance along the longitudinal axis can include 133 millimeters and the distance along the horizontal axis can include 42 millimeters (e.g., a unibody enclosure 204 includes a diameter of 42 millimeters). However, in other instances, the respective distances alone each of the longitudinal axis and the horizontal axis can be greater and/or smaller.

A portion of the housing 202, which is referred to as the unibody enclosure 204, may have a substantially uniform cross-sectional shape, such as a circle, square, triangle, or any other polygon. For instance, as illustrated in the example of FIG. 2, the unibody enclosure 204 is substantially cylindrical. Additionally, in some instances, an additional portion of the housing 202, which is referred to as the cover assembly 206, may be substantially flat. In some instances, the cover assembly 206 can be translucent (e.g., clear, transparent, etc.) such that one or more image capturing devices (illustrated below) located within the housing 202 can capture image data of the user operating the electronic device 104 through the housing 202. For instance, the cover assembly 206 can include clear glass, colored glass, clear plastic, colored plastic, any type of transparent material, or some other clear and/or colored material that is translucent enough to allow imaging devices (described below) to capture data through the surface of the cover assembly 206.

The electronic device 104 further includes a lighting apparatus 208, such as a light ring, disposed near an outer surface of the housing 202. In some instances, the light apparatus 208 can protrude from the surface of the cover assembly 206. For instance, the electronic device 104 can include a cover element 210 that protrudes from an outer surface of the cover assembly 206 of the housing 202. In some instances, the cover element 210 can protrude about 1.3 millimeters from the surface of the cover assembly 206. In other instances, the cover element 210 can protrude less than 1.3 millimeters or greater than 1.3 millimeters from the surface of the cover element 210.

The cover element 210 can be located at a location on the surface such that the cover assembly 206 blocks at least a portion of the light that is emitted by the electronic device 104 from reflecting back into a camera, which can distort the captured images. For instance, the cover element 210 can include a circular shape that surrounds an opening 212 (e.g., the location of the transparent component in some instances) in the cover assembly 206 for the camera. In some instances, the lighting apparatus 208 can be disposed within the cover element 210, such as at the end of the cover element 210. In some instances, since the cover element 210 includes a circular shape and the light apparatus 208 (also referred to as "light ring 208") includes a light ring located at the end of the cover element 210.

In some instances, as illustrated in the example of FIG. 2, an inside surface 214 of the cover element 210 can include one or more stairs 216(1)-(4) for blocking reflected light from reaching the camera. However, in other instances, the inside surface 214 of the cover element 210 may include other patterns, such as flat or circular walls. Additionally, the inside surface 214 of the cover element 210 can include a material and/or color that absorbs the light that is reflected back into the camera. For instance, the inside surface 214 of the cover element 210 can be black and/or some other dark shaded color.

The electronic device 104 can further include openings 218(1)-(N) (e.g., holes) located at one end of the housing 202 (e.g., a top end of the housing 202 when the electronic device 104 is oriented longitudinally, as illustrated in the example of FIG. 2). As discussed in detail below, within the housing 202, the electronic device 104 includes a microphone array disposed near the top of the housing. The microphone array can include one or more microphones for capturing sound from an environment in which the electronic device 104 is located, such as speech from a user. As such, the openings 218(1)-(N) allow the sound to travel from outside of the housing 202 to inside of the housing 202 so that the one or more microphones can capture the sound. In some instances, the microphone array includes four microphones and the housing 202 includes four openings 218(1)-(N) at the top end of the housing 202. However, in other instances, the microphone array may include any number of microphones and the housing 202 may include any number of openings 218(1)-(4). Additionally, in some instances, the openings 218(1)-(N) are distributed equally around the end of the housing 202 with respect to the longitudinal axis of the electronic device 104 while in other instances, the openings 219(1)-(N) are distributed at locations corresponding to where the one or more microphones are located within the housing 202.

The electronic device 104 can further include lenses 220(1)-(4) for letting emitted light travel from inside of the housing 202 to outside of the housing 202. In the example of FIG. 2, the housing 202 includes four lenses 220(1)-(4). However, in other instances, the housing 202 can include any number of lenses 220(1)-(4). In some instances, the light can be emitted from one or more lighting elements (illustrated below) located within the housing 202. For instance, the lighting elements may emit light when the electronic device 104 is capturing an image of a user. In some instances, and as illustrated below, two lighting elements are disposed within the housing and proximate to each of the lenses 220(1)-(4). However, in other instances, one or more lighting elements may be disposed within the housing and proximate to each of the lenses 220(1)-(4).

The electronic device 104 further includes a multipurpose controller 222 multipurpose controller 222 located at least partly within an opening 224 (e.g., a hole) of the housing 202 and is flush with the surface of the housing 202. However, in some instances, the multipurpose controller 222 protrudes from the surface of the housing 202. Additionally or alternatively, in some instances, the multipurpose controller 222 is located completely within the housing 202. In such instances, the user is able to access the multipurpose controller 222 through the opening 224 of the housing.

In some instance, the multipurpose controller 222 can cause the electronic device to switch from operating in an on state to operating in an off state and/or switch from operating in the off state to operating in the on state. In the on state, the electronic device 104 may activate (e.g., power, turn on) the one or more microphones and/one or more imaging devices (e.g., camera, depth sensor, etc.) while in the off state, the electronic device may deactivate (e.g., remove power, turn off) the one or more microphones and/the one or more imaging devices. In some instances, the multipurpose controller 222 can further cause the electronic device 104 to enter a setup mode. For instance, a user can press the multipurpose controller 222 for a first threshold amount of time (e.g., two seconds, five seconds, etc.) to cause the electronic device 104 to enter the setup mode. In some instances, the multipurpose controller 222 can further cause the electronic device 104 to restart (e.g., switch from operating in the on mode, to operating in the off mode, and then back to operating in the on mode). For instance, the user can press the multipurpose controller 222 for a second threshold amount of time (e.g., ten seconds, fifteen seconds, etc.) to cause the electronic device 104 to restart.

It should be noted that, while the example of FIG. 2 illustrates the housing 202 as including a first portion having a substantially uniform cross-sectional shape and a second portion having a substantially flat shape, in some instances, the entire housing 202 may include a substantially uniform cross-sectional shape. Additionally, while the example of FIG. 2 illustrates the top end and the bottom end of the housing 202 being substantially cylindrical, in other instances, the top end and/or the bottom end of the housing 202 may include a substantially level surface, triangular shape, or the like. Furthermore, in some instances, the cover assembly 206 may include additional opening to allow the depth sensing unit to capture data within the environment (e.g., an opening for the emitter and an opening for the receiver). In such instances, the cover assembly 206 may not be translucent.

Figure 3A:
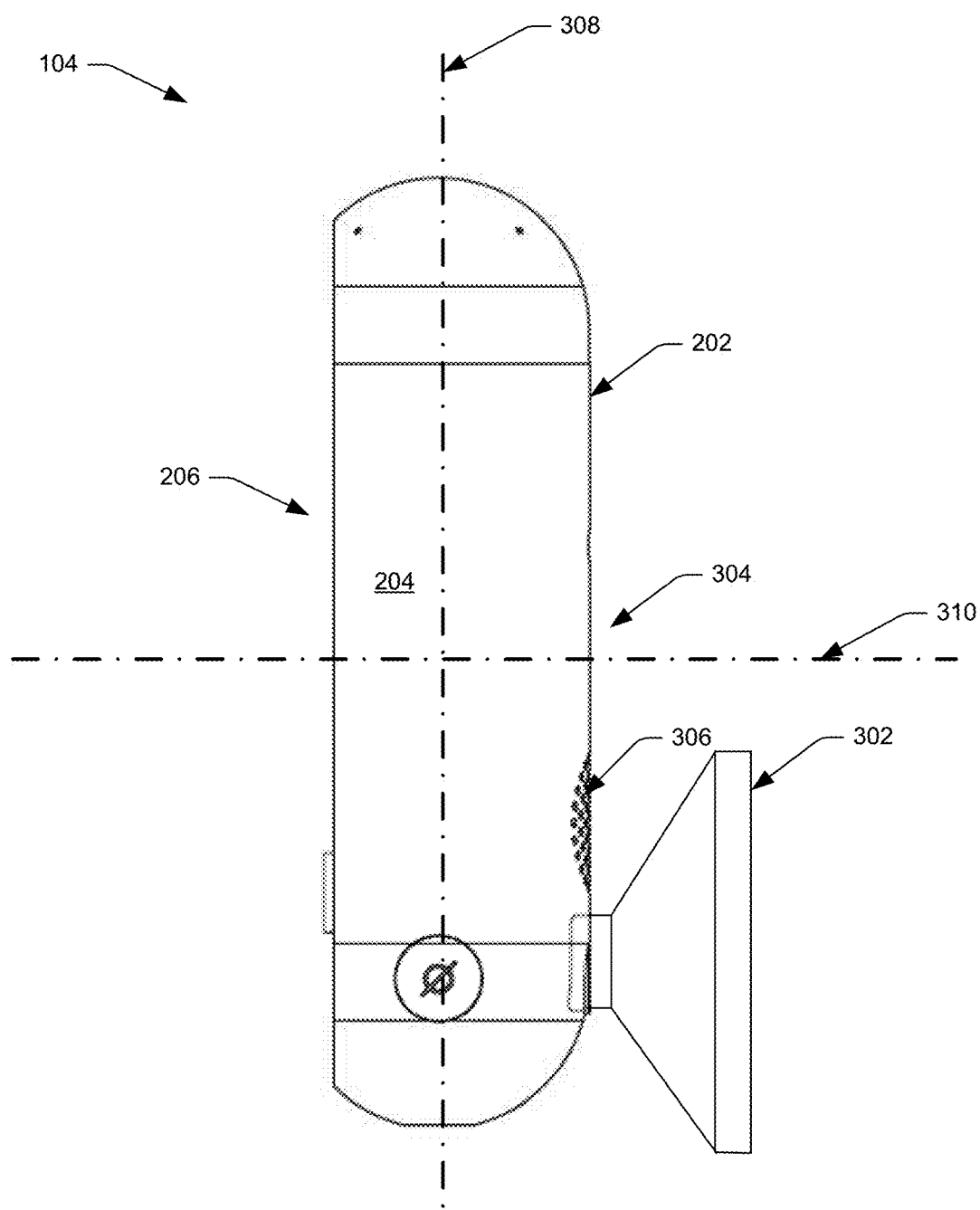
FIGS. 3A-3B illustrate examples of various locations at which a mounting component can attach to a housing of an electronic device.
Figure 3B:
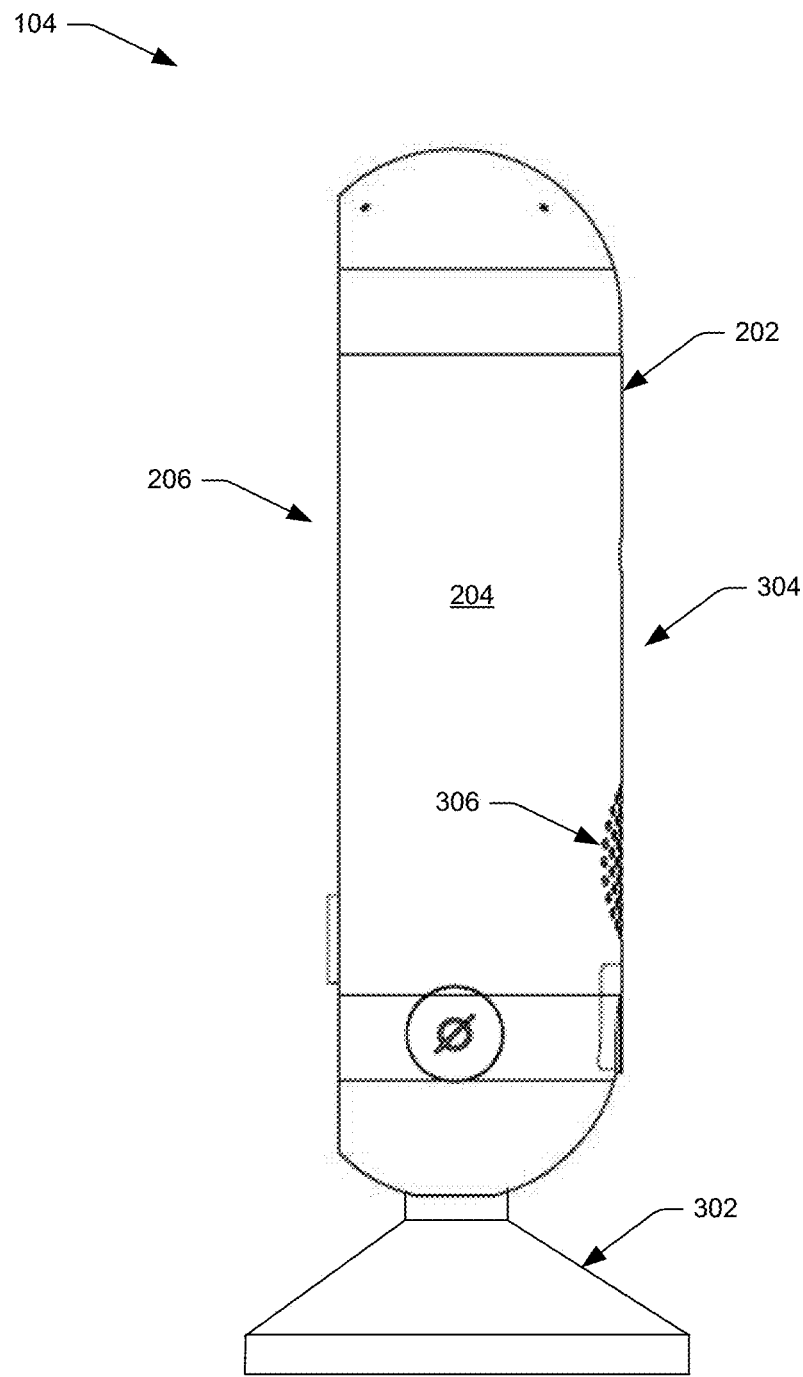

FIGS. 3A-3B illustrate examples of various locations at which a mounting component 302 can attach to the housing 202 of the electronic device 104. For instance, as illustrated in FIG. 3A, the mounting component 302 can attach to a back portion 304 of the housing 202. In some instances, the back portion 304 of the housing 202 can be located on an opposite end of the housing 202 from the cover assembly 206. As such, when the electronic device 104 is attached to a vertical surface, such as a wall, the electronic device 104 is oriented such that the cover assembly 206 (and/or similarly each of the camera and the depth sensing unit) is directed away from the vertical surface.

In some instances, when the mounting component 302 is attached to the back portion of the housing 202, the mounting component 302 can attach to the vertical surface using any number of mechanisms. For instance, in some examples, the mounting component 302 can include one or more screws and/or nails that the user utilizes to attach the mounting component 302 to the vertical surface. Additionally, or alternatively, in some examples, the mounting component 302 may include an adhesive, such as glue or double-sided tape, to attach the mounting component 302 to the vertical surface.

As also illustrated in the example of FIG. 3A, the electronic device 104 includes one or more opening 306 located on the back portion 306 the housing 202. For instance, as discussed in detail below, the electronic device 104 can include a speaker box with speaker(s) that output audible sound. In some instances, the speaker(s) may be disposed within the housing 202 such that they are located near the back portion 304 of the housing 202. Additionally, in some instances, the speaker(s) may be oriented within the housing such that the speaker(s) are directed substantially towards the one or more openings 306. Therefore, the one or more openings 306 located on the back portion 304 of the housing 202 allow the sound emitted from the speaker(s) to travel from within the housing 202 to outside of the housing 202. In some instances, and as illustrated in the example of FIG. 3, the one or more openings 306 can include a mesh of holes located on the back portion 304 of the housing 202. However, in other instances, the one or more openings 306 can include any number of holes located at any location on the housing 202.

As also illustrated in FIG. 3A, the electronic device 104 includes a longitudinal axis 308 with respect to the housing 202 and a horizontal axis 310 with respect to the housing 202. In some instances, during operation of the electronic device 104, the longitudinal axis 308 is vertical and/or substantially vertical (e.g., within a few degrees of being vertical). FIG. 3A illustrates both the horizontal axis 308 and the vertical axis 310 as a reference to the description of the electronic device 104 herein.

As illustrated in the example of FIG. 3B, the mounting component 302 can attach to an end of the housing 202 (e.g., a bottom end of the housing 202 when the electronic device 104 is oriented longitudinally). In some instances, the user can attach the mounting component 302 to the end of the housing 202 when the user wants to place the electronic device 104 on a horizontal surface, such as a table, desk, dresser, or the like. In some instances, the mounting component 302 is designed such that the mounting component 302 is capable of keeping the housing 202 oriented longitudinally when being placed on a horizontal surface. Additionally, or alternatively, in some instances, when attaching the mounting component 302 to the end of the housing 202, the user may further utilizes one or more of the mechanisms above to secure the electronic device 104 to the horizontal surface.

Figure 4A:
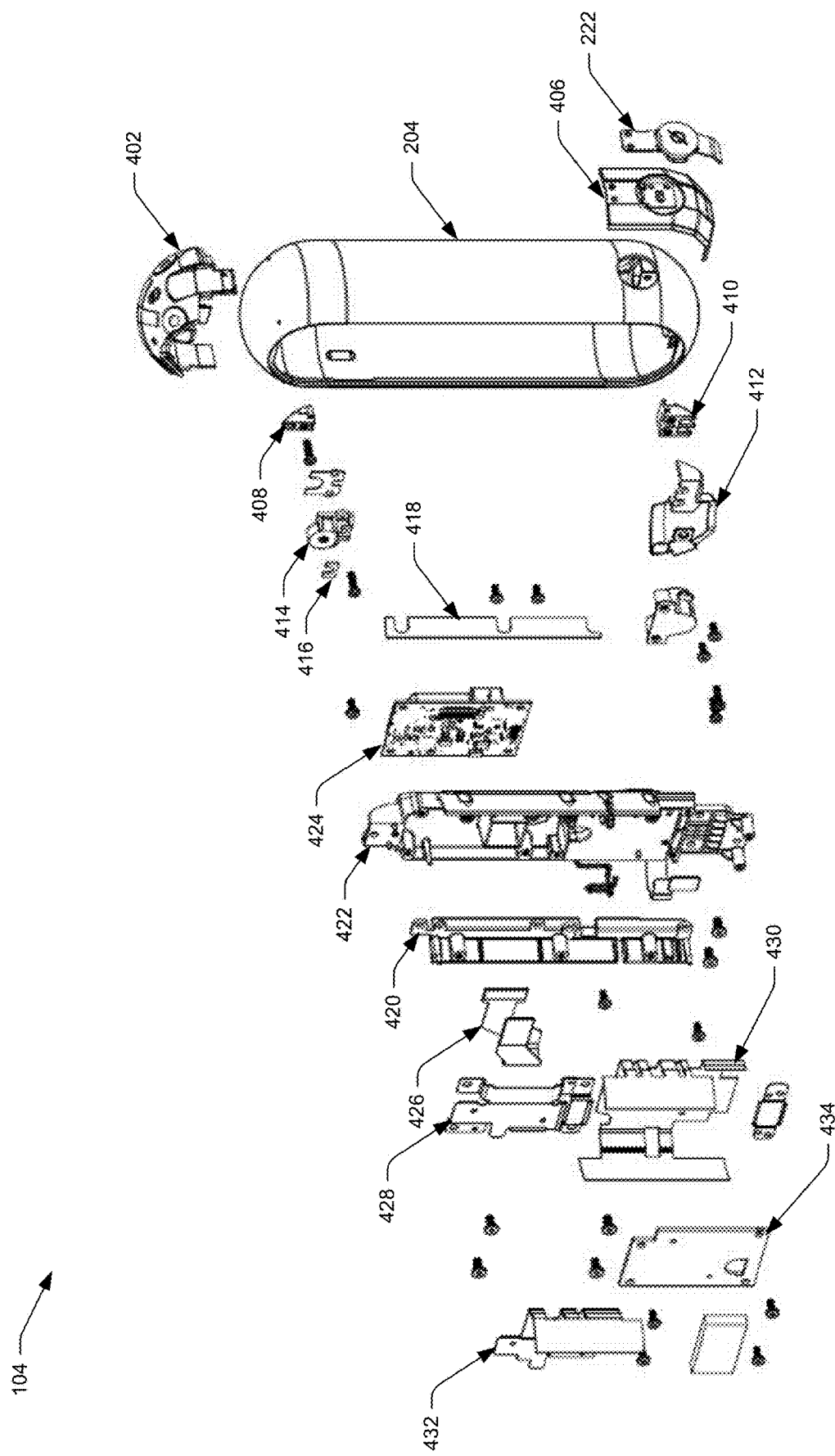
FIGS. 4A-4B illustrate an example of a layout of the components of an electronic device.
Figure 4B:
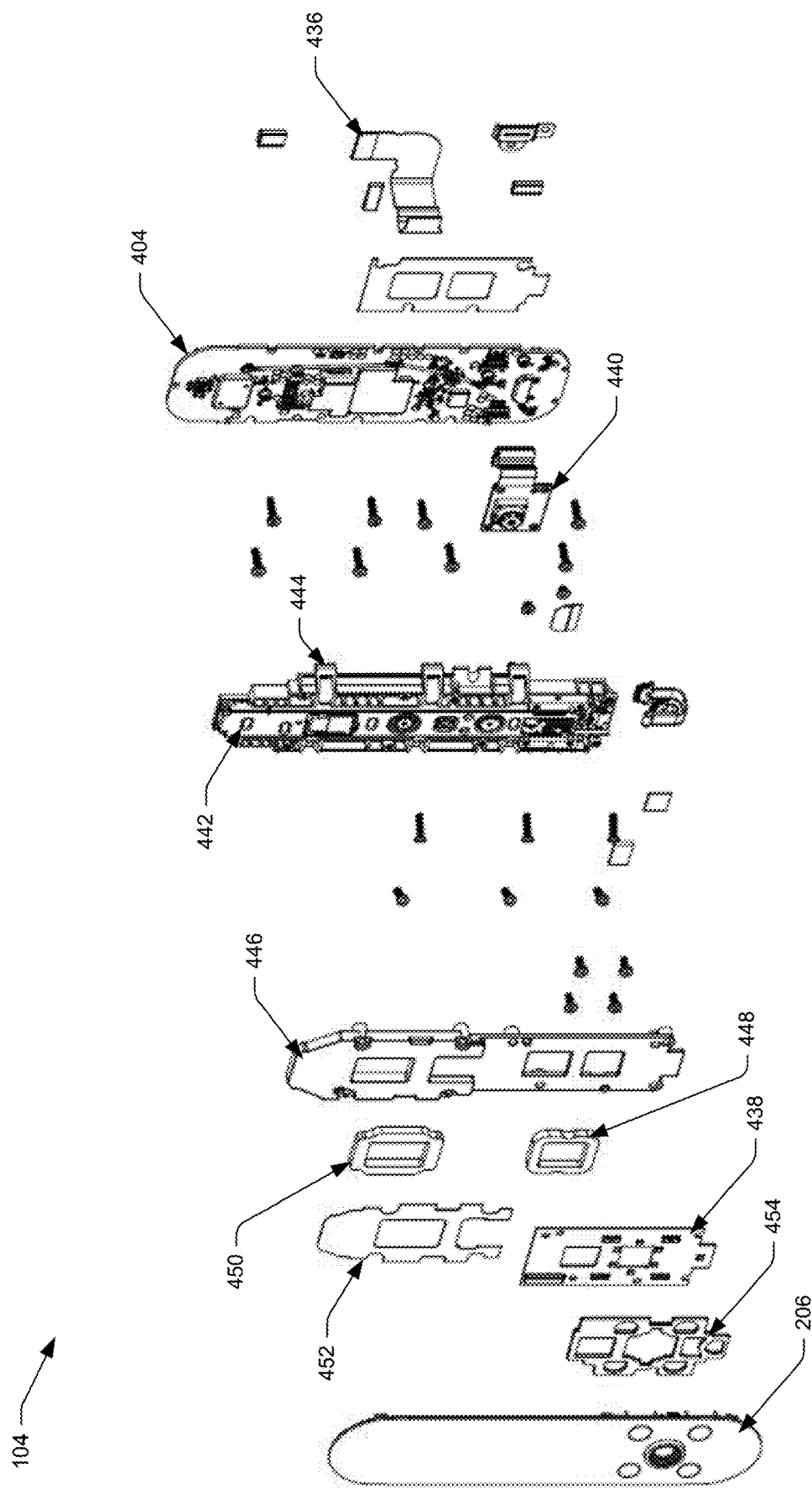

FIGS. 4A-4B illustrate an example of a layout of the components of the electronic device 104. As illustrated, the electronic device 104 includes the unibody enclosure 204 to which some or all of the remaining components of the electronic device 104 may at least partly reside within. For instance, the electronic device 104 can include a microphone array 402 that is disposed at a first end within the unibody enclosure 204. The microphone array 402 can include one or more microphones, such as four microphones in one example, that capture sound from the environment in which the electronic device 104 is placed. In some instances, when the microphone array 402 includes more than one microphone, the microphones may be uniformly situated around a longitudinal axis of the electronic device 104 so that the electronic device 104 can better capture sound that originates from multiple directions around the electronic device 104. Additionally, or alternatively, in some instances, when the microphone array 402 includes more than one microphone, the microphones may be positioned within the electronic device 104 such that the electronic device 104 captures sound from one or more specific directions (e.g., pointed in a one or more specific directions).

In some instances, the microphone array 402 may further include one or more flexible printed circuit (FPC) antennas (e.g., Wi-Fi FCPs). Each of the FPC antennas may be connected to a main printed circuit board (PCB) assembly 404 (discussed below) using one or more connections. For instance, each of the FPC antennas can be connected to the main PCB assembly 404 using one or more spring contacts. In such an instance, a first contact can be for a signal and a second contact can be for ground. Additionally, in some instances, the microphone array 402 can further include one or more microphone holes and a microphone seal. The microphone seal can include a pressure-sensitive (PSA) mess, a PSA foam, and/or a PSA tape.

The electronic device 104 further includes a multipurpose controller 222 and button carrier 406. In some instances, the multipurpose controller 222 can include a plastic component with a recessed icon molded into the plastic. For instance, the multipurpose controller 222 can include one or more of a thermoplastic polyurethane (TOU) and a polychlorinated biphenyl. The button carrier 406 is configured to receive the multipurpose controller 222. In some instances, the button carrier 406 can include one or more strips of PSA tape to bond the button carrier 406 within the unibody enclosure 204 in order to hold the multipurpose controller 222 in place. Additionally, or alternatively, in some instances, the button carrier 406 can include one or more additional attachments to ensure that a switch on the button carrier 406 does not move relative to the unibody enclosure 204.

In some instances, the button carrier 406 can include one or more FPC antennas (e.g., Wi-Fi FCPs) and one or more power FPCs. In such instances, each of the one or more FPC antennas and one or more power FPCs can connect to the main PCB assembly 404 within the unibody enclosure 204 using one or more connections. For instance, at least one power FPC may connect to the main PCB assembly 404 using one or more spring contacts. Additionally, at least one FPC antenna may connect to the main PCB assembly 404 using a coaxial cable.

The electronic device 104 further includes a first wedge component 408 and a second wedge component 410. As illustrated, the first wedge component 408 can be disposed at a first end (e.g., the top end) of the unibody enclosure 204 and the second wedge component 410 can be disposed at a second end (e.g., the bottom end) of the unibody enclosure 204. Each of the first wedge component 408 and the second wedge component 410 can include nut inserts for receiving a screw in order to secure one or more of the other components (e.g., the midframe described below) within the unibody enclosure 204.

The electronic device 104 further includes a carrier component 412 that includes at least one FPC antenna (e.g., Wi-Fi FCP). The FPC antenna is connected to the main PCB assembly 404 using one or more types of connections. For instance, the FPC antenna can be connected to the main PCB assembly 404 using a coaxial cable. The electronic device 104 further includes a mechanical spacer 414 and a tolerance gap filler 416 that attaches to the mechanical spacer 414.

The electronic device 104 includes PSA tape 418, a side frame 420, and a midframe 422. The midframe 422 and the side frame 420 together create a midframe assembly that secures multiple components within the unibody enclosure 204. In some instances, the PSA tape 418 is used to secure the side frame 420 to the midframe 422. In some instances, one or more other connection mechanisms (e.g., screws, clips, etc.) are used to secure the side frame 420 to the midframe 422. The midframe 422 includes a speaker box component (shown in detail with regard to FIG. 8). that is bonded onto the midframe 422. In some instances, the midframe 422 and the side frame 420 can include aluminum while in other instances, the midframe 422 and/or the side frame 420 can include a different type of material.

In some instances, the midframe 422 includes a speaker grill that includes holes. In some instances, one or more speakers occupy a first portion of the speaker grill (e.g., a top half) while a second portion of the speaker grill is non-acoustic. Rather, the second portion of the speaker grill is covered with a sealing material (e.g., a rubber), and the material is molded with an opening at each of one or more of the holes of the speaker grill. As such, a test pin can be placed though the sealing material via the speaker grill and contact an internal test point to transfer data (e.g., test data) to the electronic device 104. In some instances, the internal test point is included on the main PCB assembly 404. In some instances, by using such a technique to transfer data, the electronic device 104 is not required to include a high data output port (e.g., a Universal Serial Bus (USB) port, etc.) transfer data to the electronic device 104.

The electronic device 104 further includes a power entry PCB assembly 424. The power entry PCB assembly 424 includes at least one component (e.g., a jack) that provides power to the electronic device 104. Additionally, the electronic device 104 includes a jumper FPC 426 that transfers the power and any signals from the power entry PCB assembly 424 to the main PCB assembly 404.

The electronic device 104 further includes a mechanical component 428, a first heat spreader component 430, and a second heat spreader component 432. The mechanical component 428 provides mechanical shielding to protect other components within the electronic device 104. Each of the first heat spreader component 430 and the second heat spreader component 432 take heat from the power entry PCB assembly 424 and spread it throughout the electronic device 104. For instance, each of the first heat spreader component 430 and the second heat spreader component 432 can spread the heat to the walls of the unibody enclosure 204. In some instances, the each of the first heat spreader component 430 and the second heat spreader component 432 can include copper tape. In other instances, the first heat spreader component 430 and/or the second heat spreader component 432 can include a different heat spreading material.

The electronic device 104 further includes a third heat spreader component 434 disposed on the one or more speakers. The third heat spreader component 434 prevents heat generated by the main PCB assembly 404 from reaching the back of the electronic device 104 (e.g., from reaching the power entry PCB assembly 424. In some instances, the third heat spreader component 434 includes stainless steel while in other instances, the third heat spread component 434 includes a different heat spreading material.

As illustrated in FIG. 4B, the electronic device 104 further includes a jumper FPC 436 and a lighting PCB assembly 438. The jumper FPC 436 connects the main PCB assembly 404 to the lighting PCB assembly 438.

The main PCB assembly 404 can include one or more layers of surface-mount technology (SMT). For instance, in some examples, the main PCB assembly 404 can include twelve layers of double-sided SMT. The main PCB assembly 404 can further include one or more network interface chips (e.g., Wi-Fi chips), one or more memories, and one or more processors. In some instances, the main PCB assembly 404 can further include a coaxial cable to connect one or more of the FPC antennas to a network interface chip located on the main PCB assembly 404.

The electronic device 104 further includes a camera 440. In some instances, the camera 440 can include a still image camera, a video camera, a red-green-blue (RGB) camera, or any other type of camera that can capture image data within an environment. In such instances, the lens of the camera 440 can be positioned within the opening 212 on the cover assembly 206 and/or the cover assembly 206 can include a transparent component (described below) that protects the camera 440 and seals the electronic device 104. Additionally, or alternatively, in some instances, the camera 440 may only include one or more components of a camera, such as the lens, viewfinder, aperture, sensor (e.g., image sensor), and/or the like. For instance, the camera 440 may include the sensor, and the lens for the camera may be disposed on the cover assembly 206 (e.g., the lens can include the transparent component described below).

The camera 440 can include a connector that connects the camera 440 to the main PCB assembly 404. Additionally, in some instances, the electronic device 104 can include a bracket that secures the connection between the camera 440 and the main PCB assembly 404. Furthermore, and as illustrated in detail below, the camera 440 can be disposed on the depth sensing unit 442 within the electronic device 104.

The electronic device 104 further includes a chassis 444 and the depth sensing unit 442. In some instances, the chassis 444 can include aluminum while in other instances, the chassis 444 can include a different type of material. As illustrated, the camera 440 and the depth sensing unit 442 are disposed on the chassis 444 at a first end. In some instances, the depth sensing unit 442 can include an emitter (e.g., projector) and a receiver (e.g., camera). In other instances, the depth sensing unit 442 can include any type of depth sensor that captures data for performing one or more range imaging techniques.

The electronic device 104 further includes a backer component 446. In some instances, the backer component 446 takes heat from inside of the electronic device 104 and spreads it to the walls of the unibody enclosure 204. In some instances, the backer component 446 provides support for the lighting PCB assembly 438. Additionally, in some instances, the backer component 446 provides a landing surface for each of a first seal component 448, a second seal component 450, and a third seal component 452.

The first foam component 448 can provide sealing around the receiver of the depth sensing unit 442. The second seal component 450 can provide sealing around the receiver of the depth sensing unit 442. Additionally, the third seal component 452 can help attach the cover assembly 206 to the unibody enclosure 204. In some instances, each of the first seal component 448, the second seal component 450, and the third seal component 452 can include foam. In some instances, the first seal component 448, the second seal component 450, and/or the third seal component 452 can include a different type of material.

The electronic device 104 further includes a light sealing component 454. As will be described further below, the electronic device 104 includes lighting elements that emit light into an environment, such as when a user is interacting with the electronic device 104. In some instances, each lighting element may emit light through a given portion of the electronic device 104 (e.g., the light ring, a lens, etc.) in order to indicate that the electronic device 104 is performing a specific function. As such, the light sealing component 454 seals the light being emitted by each of the lighting elements so that the light being emitted by a respective lighting element only travels through the portion of the electronic device 104 corresponding to that respective lighting element.

Figure 5:
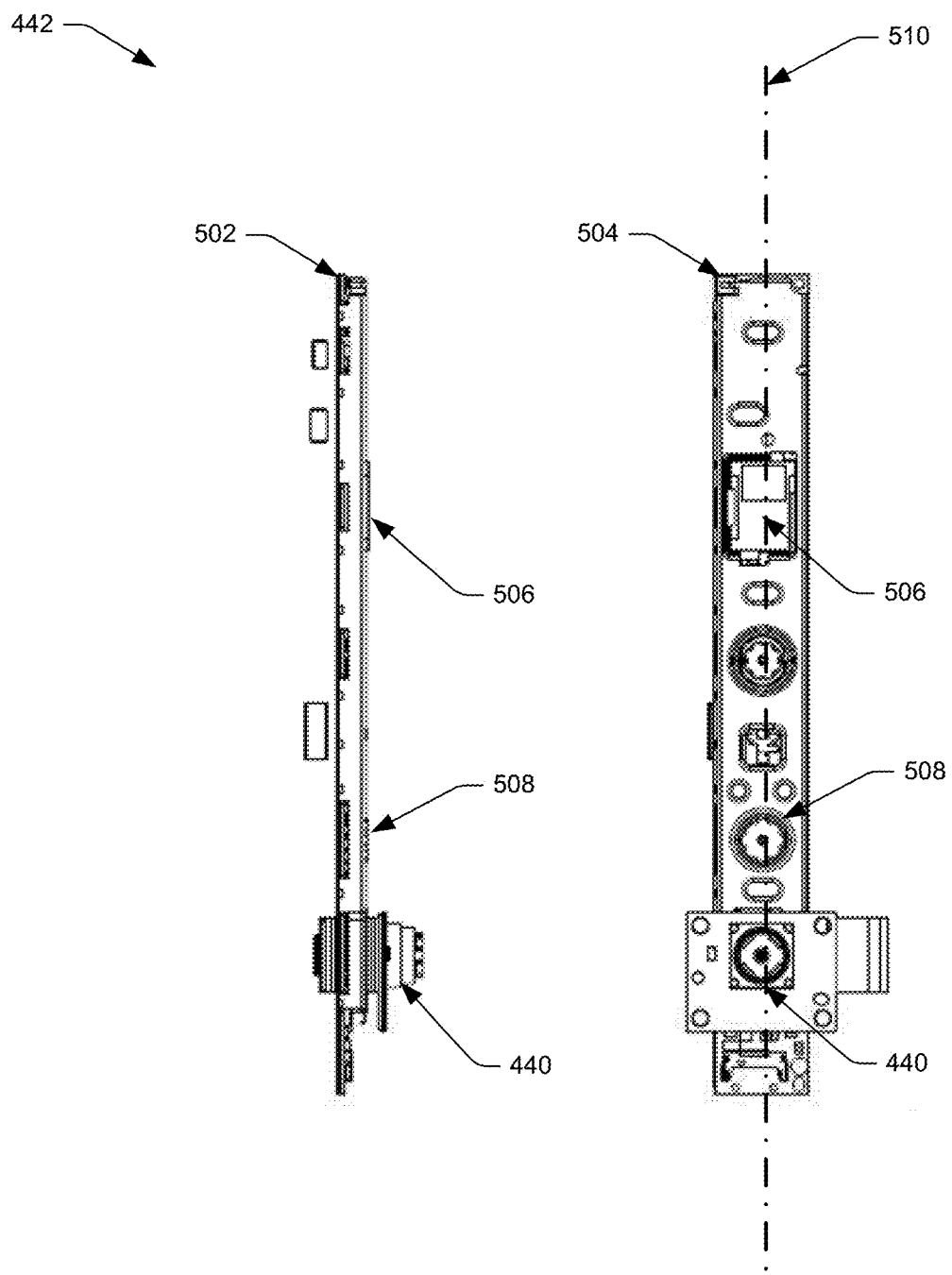
FIG. 5 illustrates an example of a layout of the components of a depth sensing unit for an electronic device.

FIG. 5 illustrates an example of a first view 502 (e.g., side view) of the components of the depth sensing unit 442 and a second view 504 (e.g., front view) of the components of the depth sensing unit 442. As illustrated, the depth sensing unit 442 includes a emitter 506 and a receiver 508. In some instances, the emitter 506 can include an infrared emitter (e.g., infrared projector) and the receiver 508 can include an infrared receiver (e.g., infrared camera). In other instances, the emitter 506 can include any type of device that emits electromagnetic radiation (i.e., light) into an environment, such as x-rays, gamma rays, ultraviolet light, infrared light, and/or visible light. Additionally, the receiver 508 can include any type of device that captures the light from the emitter 506.

Figure 17:
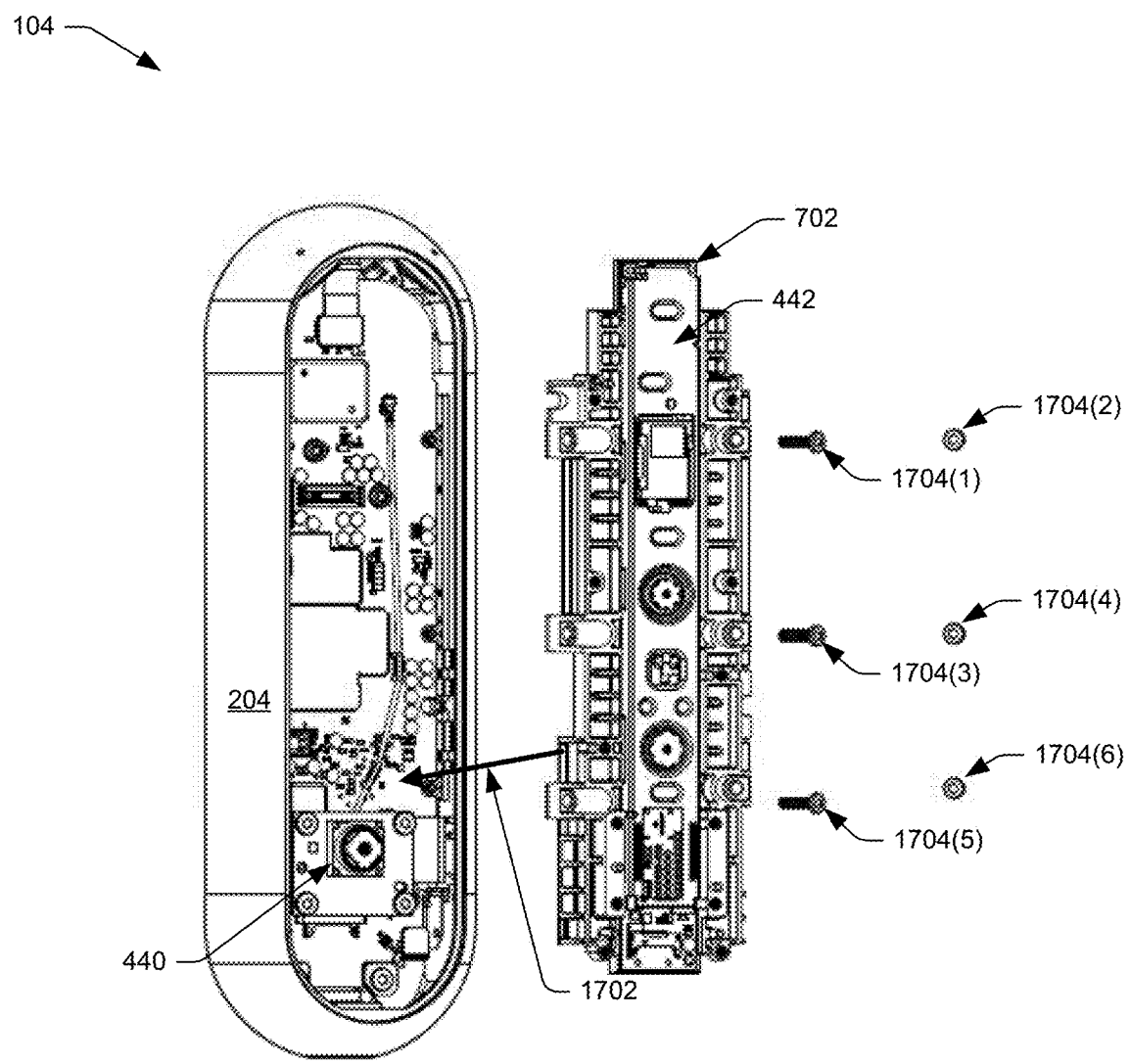
FIG. 17 illustrates an example of disposing a middle bracket sub-assembly within an electronic device.

In some instances, and as illustrated in FIG. 5, the emitter 506 and the receiver 508 are disposed vertically on the depth sensing unit 442 with respect to a longitudinal axis 510 of the depth sensing unit 442. Additionally, and as illustrated in FIG. 17, the depth sensing unit 442 is then disposed within the housing 202 of the electronic device 104 such that the longitudinal axis 510 of the depth sensing unit 442 is parallel to the longitudinal axis of the housing 202. In such instances, the emitter 506 and the receiver 508 are disposed vertically in order to maximize the field of view of the electronic device 104. However, in other instances, the emitter 506 and the receiver 508 can be disposed using a different configuration, such as horizontally on the depth sensing unit 442 with respect to the longitudinal axis 510. Additionally, as illustrated in FIG. 5, the emitter 506 is disposed above the receiver 508 on the depth sensing unit 442. In other instances, the receiver 508 may be disposed above the emitter 506 on the depth sensing unit 442.

As also illustrated in FIG. 5, the camera 440 is disposed on the depth sensing unit 442 vertically below the emitter 506 and the receiver 508. Additionally, the camera 440 is disposed within twenty millimeters of the receiver 508 on the depth sensing unit 442. However, in other instances, the camera 440 may be disposed on the depth sensing unit 442 at a location that is greater than twenty millimeters from the receiver 508. Additionally, in other instances, the camera 440 may be disposed above the receiver 508 and/or above the emitter 506 on the depth sensing unit 442. Moreover, in other instances, the camera 440 may not be disposed vertically below the emitter 506 and the receiver 508 on the depth sensing unit 442. For instance, the camera 440 may be disposed horizontally on the depth sensing unit 442 with respect to the emitter 506 and/or the receiver 508.

Figure 6:
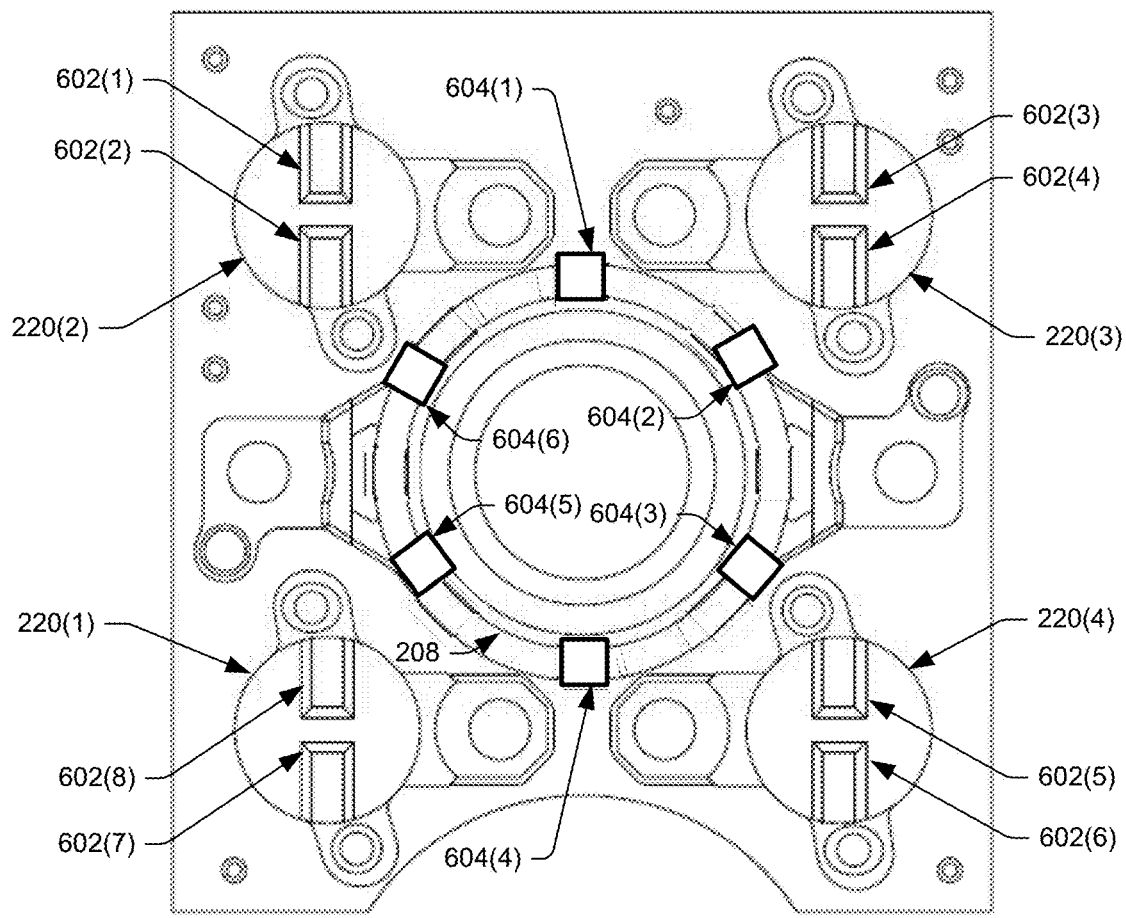
FIG. 6 illustrates an example of a layout of the components of a lighting system for an electronic device.

FIG. 6 illustrates an example of a layout of the components of the lighting system for the electronic device 104. As illustrated, the lighting system includes four lenses 220(1)-(4) (e.g., Fresnel lenses, iconic lenses, etc.) with two lighting elements 602(1)-(8) disposed under each of the lenses 220(1)-(4). For instance, lighting elements 602(7)-(8) are disposed under the first lens 220(1), lighting elements 602(1)-(2) are disposed under the second lens 220(2), lighting elements 602(3)-(4) are disposed under the third lens 220(3), and lighting elements 602(5)-(6) are disposed under the fourth lens 220(4).

The lighting elements 602(1)-(8) may operate as the flash for the camera 440 of the electronic device 104. For instance, the lighting elements 602(1)-(8) can emit light into an environment when the camera 440 is capturing images of the user 102. In some instances, each of the lighting elements 602(1)-(8) may include a light-emitting diode (LED). In some instances, each lens 220(1)-(4) may include one cool LED and one warm LED disposed under the respective lens 220(1)-(4). For example, each of lighting elements 604(1), 604(3), 604(5), and 604(7) may include a cool LED, and each of lighting elements 604(2), 604(4), 604(6), and 604(8) may include a warm LED. For another example, each of lighting elements 604(1), 604(3), 604(5), and 604(7) may include a warm LED, and each of lighting elements 604(2), 604(4), 604(6), and 604(8) may include a cool LED.

As also illustrated in FIG. 6, the lighting system includes the lighting apparatus 208 (e.g., the light ring). The lighting system can include lighting elements 604(1)-(6) disposed under the lighting apparatus 208. In some instances, the lighting elements 604(1)-(6) are equally disposed around a circumference of the lighting apparatus 208. In other instances, the lighting elements 604(1)-(6) may not be disposed equally around the circumference of the lighting apparatus 208. In some instances, each of the lighting elements 604(1)-(6) can include a LED that emits light within the lighting apparatus 208. As discussed above, the electronic device 104 can emit light using the lighting apparatus 208 while interacting with the user 102.

It should be noted that the example of FIG. 6 illustrated four lenses 220(1)-(4), eight lighting elements 602(1)-(8) under the lenses 220(1)-(4), and six lighting elements 604(1)-(6) disposed under the lighting apparatus 208. In other instances, the electronic device 104 may include any number of lenses, lighting elements disposed under each of the lenses, and lighting elements disposed under the lighting apparatus 208. For instances, the lighting apparatus 208 may include one lighting element, five lighting elements, ten lighting elements, or the like. Additionally, each lens may include one lighting element, five lighting elements, ten lighting elements, or the like.

Figure 7:
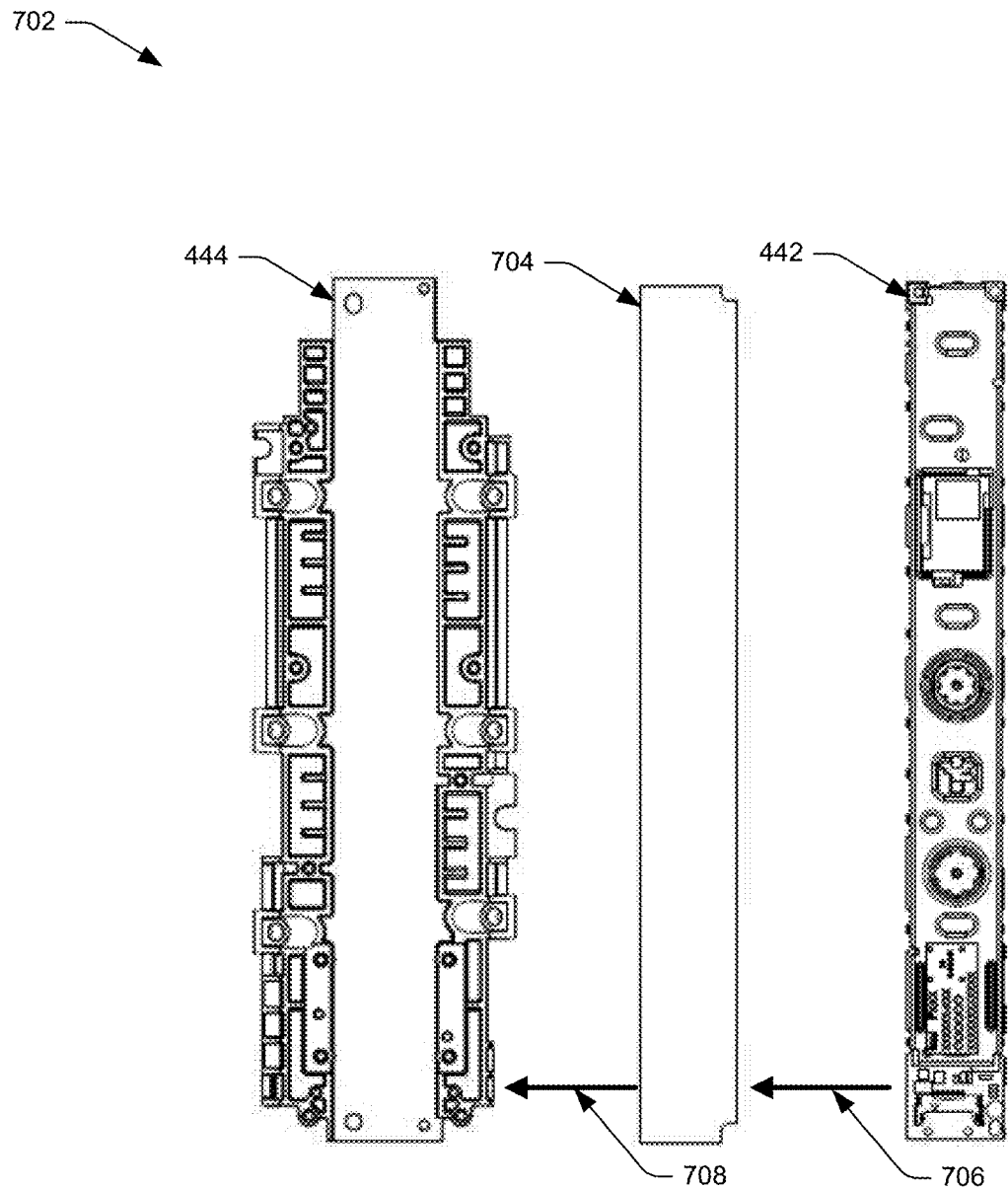
FIG. 7 illustrates an example of assembling a middle bracket sub-assembly.

FIG. 7 illustrates an example of assembling a middle bracket sub-assembly 702. As shown, the middle bracket sub-assembly 702 includes the chassis 444, the depth sensing unit 442, and a connecting mechanism 704. In some instances, the connecting mechanism 704 can include an adhesive (e.g., PSA tape). In some instances, the connecting mechanism 704 is electronically insulating and/or thermally conductive. For instance, the connecting mechanism 704 can include an adhesive that is electronically insulating and thermally conductive. In some instances, the middle bracket sub-assembly 702 and include additional connection mechanisms to attach the depth sensing unit 442 to the chassis, such as screws, clamps, or the like.

The depth sensing unit 442 is disposed onto a first surface of the connecting mechanism 704, as represented by 706. Additionally, a second, opposite surface of the connecting mechanism 704 is disposed onto the chassis 444, as represented by 708. In some instances, the chassis 444, the connecting mechanism 704, and depth sensing unit 442 are attached by pressing the chassis 444 and the depth sensing unit 442 together when the connecting mechanism 704 is located between the chassis 444 and the depth sensing unit 442. In some instances, the pressing can be performed manually while in other instances, the pressing can be performed by a machine.

Figure 8:
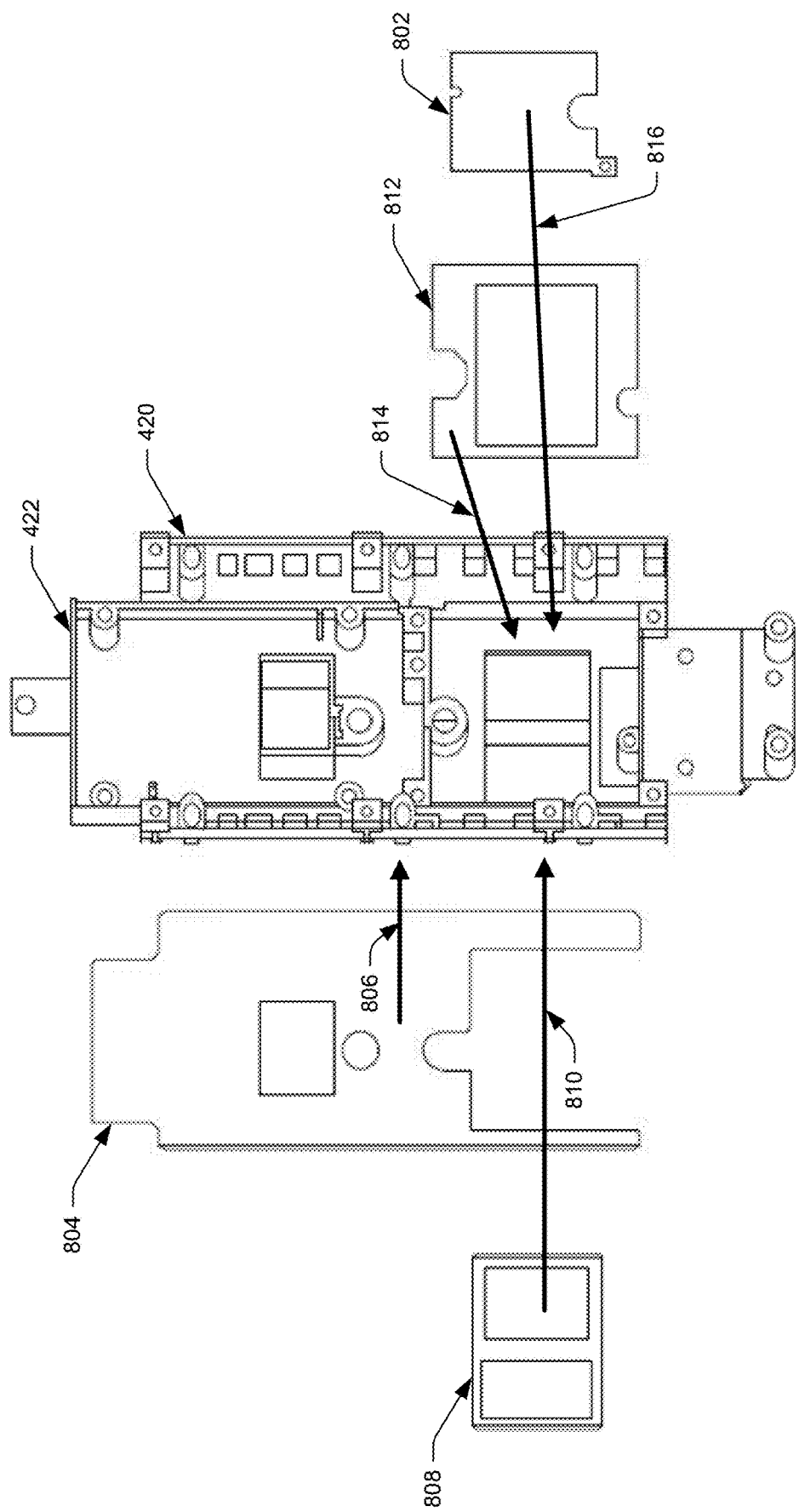
FIG. 8 illustrates an example of assembling a midframe with a speaker box.

FIG. 8 illustrates an example of assembling a midframe 422 with a speaker box 802. As shown, a first connection mechanism 804 is disposed to a first surface (e.g., the back surface in FIG. 8) of the midframe 422, as represented by 806. In some instances, the first connection mechanism 804 can include an adhesive, such as PSA tape. A speaker mesh 808 is then disposed on the first surface of the midframe 422, as represented by 810. In some instances, the speaker mesh 808 is attached to the midframe 422 using the first connection mechanism 804. In other instances, the speaker mesh 808 is attached to the midframe 422 using another type of connection mechanism, such as one or more screws, one or more clamps, or the like.

A second connection mechanism 812 is disposed on a second, opposite surface (e.g., the front surface in FIG. 8) of the midframe 422, as represented by 814. In some instances, the second connection mechanism 812 can include an adhesive, such as PSA tape. The speaker box 802 is then disposed on the second surface of the midframe 422, as represented by 816. In some instances, the speaker box 802 is attached to the midframe 422 using the second connection mechanism 812. In other instances, the speaker box 802 is attached to the midframe 422 using another type of connection mechanism, such as one or more screws, one or more clamps, or the like.

Figure 9:
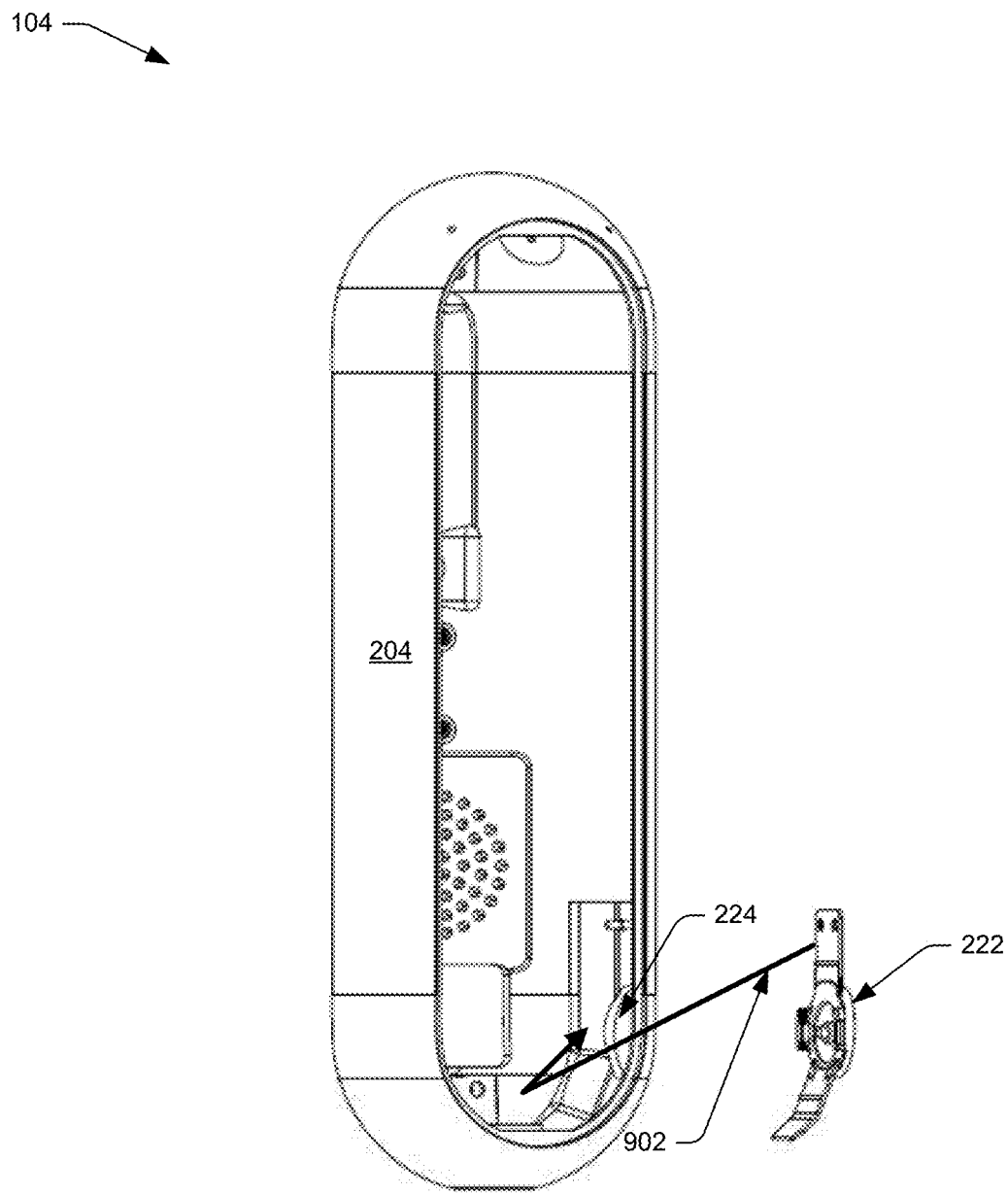
FIG. 9 illustrates an example of disposing a power key within an electronic device.

FIG. 9 illustrates an example of disposing the multipurpose controller 222 into the electronic device 104. As shown, the multipurpose controller 222 is placed within the unibody enclosure 204 such that the multipurpose controller 222 is located within the opening 224 of the unibody enclosure 204, as represented by 902. In some instances, the multipurpose controller 222 is placed within the unibody enclosure 204 and then held into place using the button carrier 406 (not shown). Additionally, or alternatively, in some instances, the multipurpose controller 222 is secured into place using an additional connection mechanism, such as an adhesive, one or more screws, one or more clamps, or the like.

Figure 10:
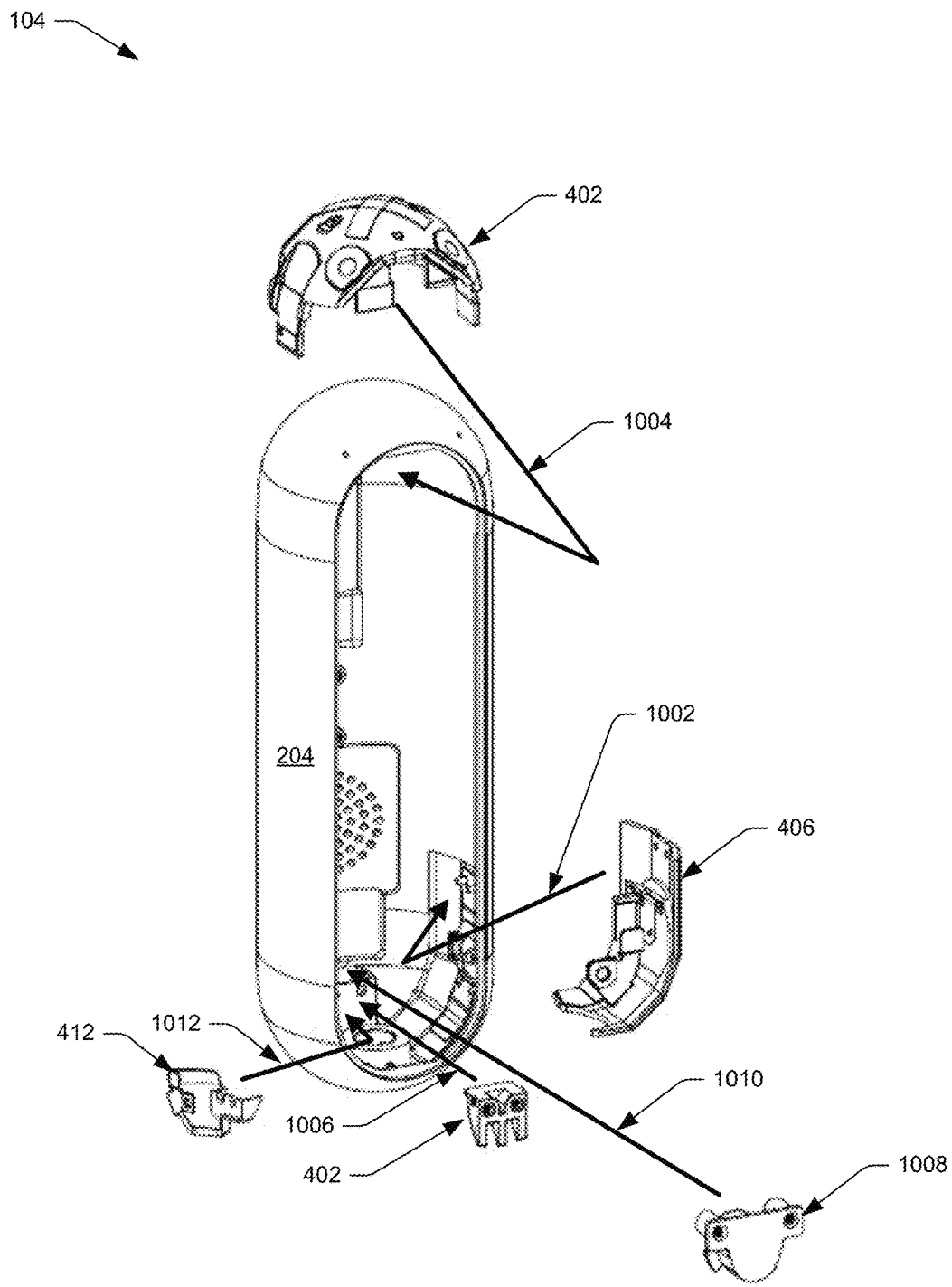
FIG. 10 illustrates an example of disposing a microphone array and button flex carrier within an electronic device.

FIG. 10 illustrates an example of disposing the microphone array 402 and the button carrier 406 into the electronic device 104. As shown, the button carrier 406 is disposed into the unibody enclosure 204 to secure the multipurpose controller 222 into place, as represented by 1002. In some instances, the button carrier 406 includes a connection mechanism, such as an adhesive (e.g., PSA tape), that secures the button carrier 406 into place. A dome switch (not shown) is then disposed on the button carrier 406. In some instances, the dome switch is secured to the button carrier 406 using a connection mechanism, such as an adhesive (e.g., PSA tape).

The microphone array 402 is disposed into a top end of the unibody enclosure 204, as represented by 1004. In some instances, to dispose the microphone array 402 into the unibody enclosure 204, and based on the shape of the microphone array 402, the microphone array 402 is rotated so that the microphone array 402 can fit within the unibody enclosure 204. In such instances, the microphone array 402 is then rotated back and disposed into the top end of the unibody enclosure 204. In some instances, the microphone array 402 snaps into place at the top end of the unibody enclosure. Additionally, or alternatively, in some instances, a connection mechanism is used to secure the microphone array 402 to the unibody enclosure 204, such as an adhesive, one or more screws, one or more clamps, or the like.

As also illustrated in FIG. 10, the second wedge component 410 is disposed at a bottom end of the unibody enclosure 204, as represented by 1006. Additionally, a securing mechanism 1008 is disposed near the bottom end of the unibody enclosure 204, as represented by 1010. The securing mechanism 1008 is later screwed into the midframe 422. As such, in some instances, the securing mechanism 1008 is originally just placed inside the unibody enclosure 204 and secured into place when the midframe 422 is later disposed into the unibody enclosure 204. Additionally, or alternatively, in some instances, a connection mechanism is used to secure the securing mechanism 1108 to the unibody enclosure 204, such as an adhesive, one or more screws, one or more clamps, or the like.

Additionally, as illustrated in FIG. 10, the carrier component 412 is disposed near the bottom end of the unibody enclosure 204, as represented by 1012. In some instances, the carrier component 412 is secured into place using one or more screws. In other instances, the carrier component 412 is secured into place using one or more other connection mechanisms, such an adhesive, one or more clamps, or the like. In some instances, the carrier component 412 is disposed within the unibody enclosure 204 after the securing mechanism 1008. In other instances, the carrier component 412 is disposed within the unibody enclosure 204 before the securing mechanism 1008.

Figure 11:
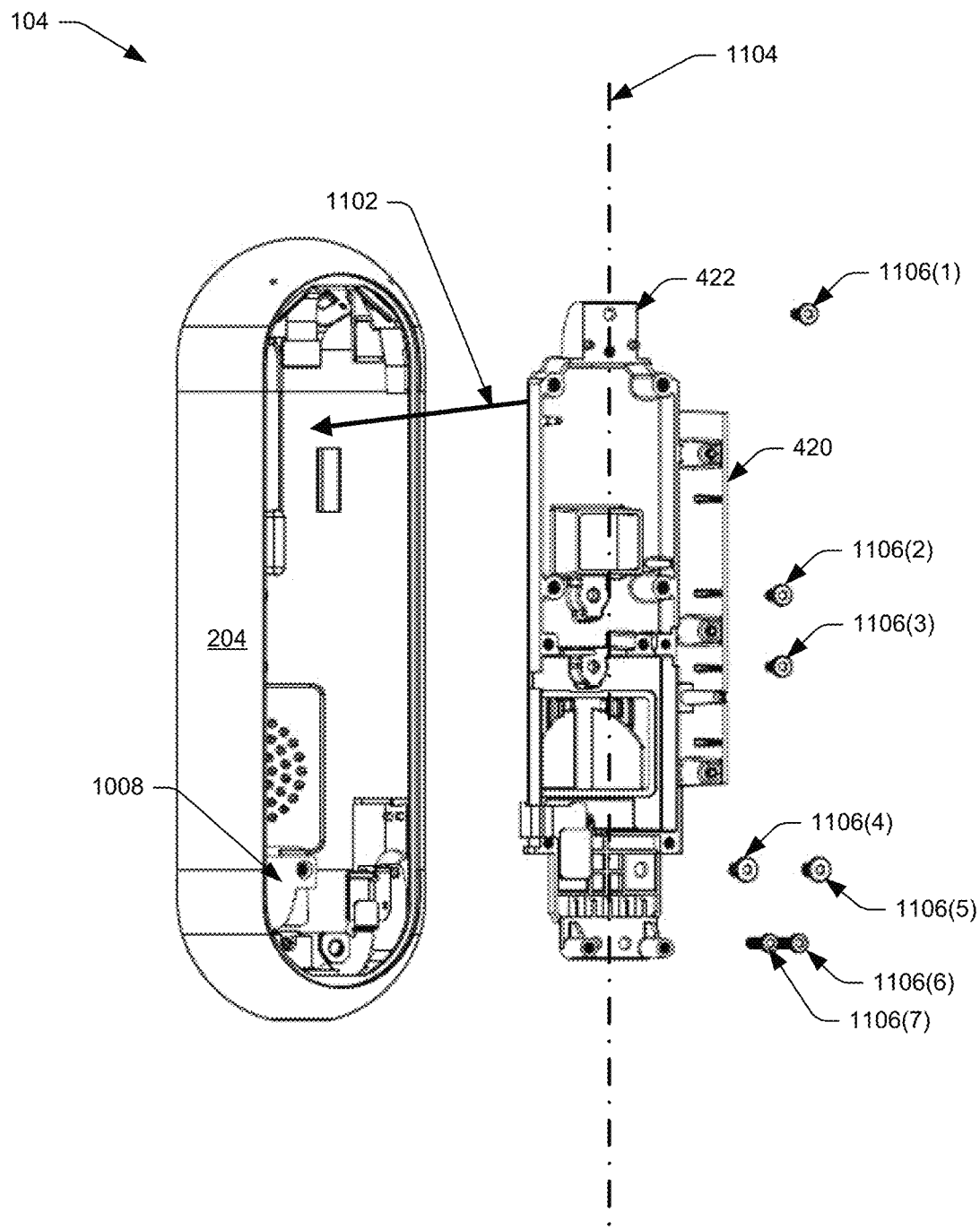
FIG. 11 illustrates an example of disposing a midframe within an electronic device.

FIG. 11 illustrates an example of disposing the midframe 422 into the electronic device 104. As shown, the midframe 422 is disposed within the unibody enclosure 204, as represented by 1102. In some instances, the midframe 442 may be disposed within the unibody enclave 204 along the longitudinal axis of the housing 202. For instance, as shown in FIG. 11, the longitudinal axis 1104 of the midframe 442 may be parallel with the longitudinal axis of the housing 202. To secure the midframe 422 into place, screws 1106 (1)-(7) may attach the midframe 422 to the unibody enclosure 204. For example, five screws 1106(1)-(5) may attach the midframe 422 to the unibody enclosure and two screws 1106(6)-(7) may attach the midframe 422 to the securing mechanism 1008. In some instances, more or less screws may be used to secure the midframe 422 within the unibody enclosure 204. Additionally, in some instances, an additional connection mechanism may be used to secure the midframe 422 to the unibody enclosure 204, such as an adhesive, one or more clamps, or the like.

Figure 12:
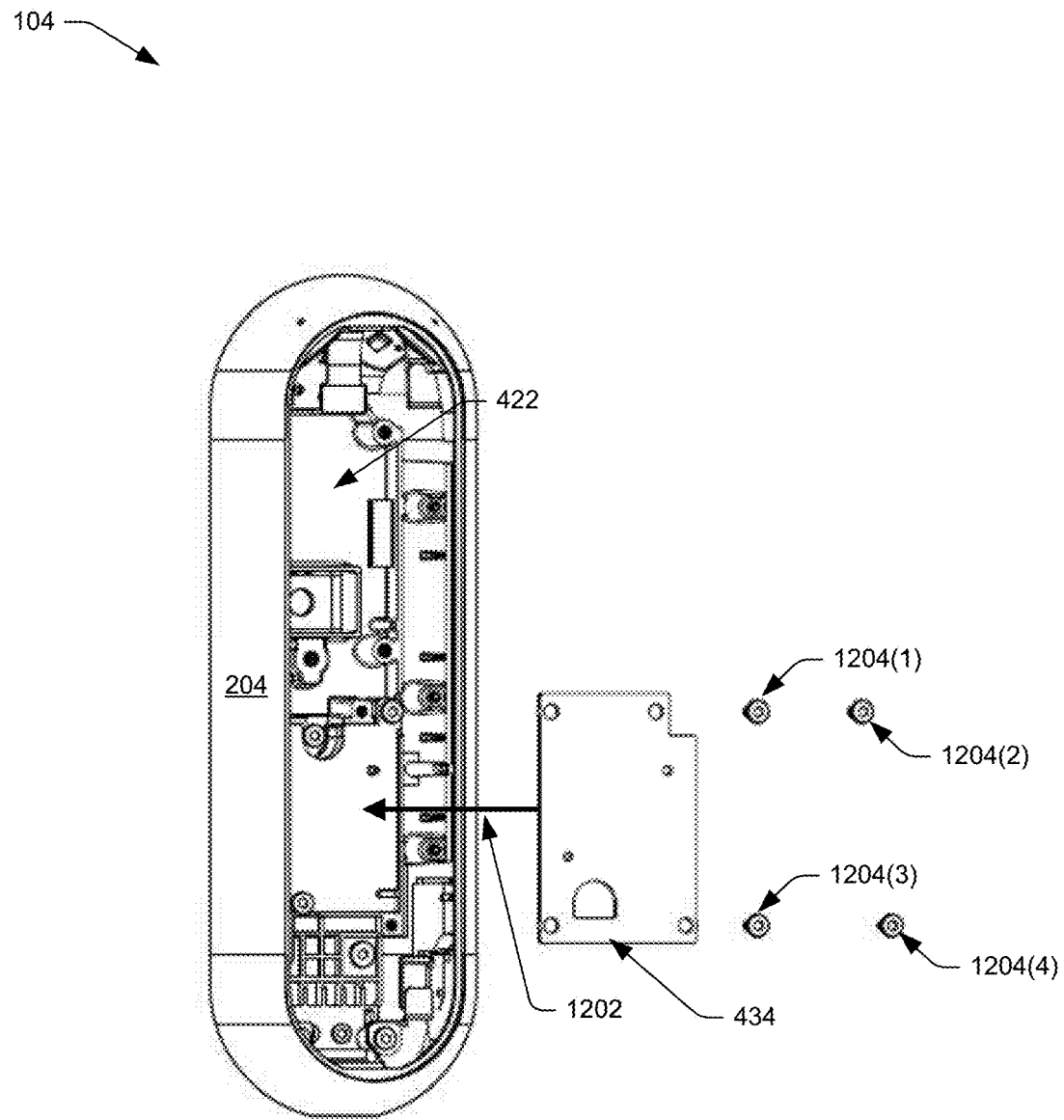
FIG. 12 illustrates an example of disposing a speaker bracket within an electronic device.

FIG. 12 illustrates an example of disposing a speaker bracket (also referred to as the third heat spreading component 434) into the electronic device 104. As shown, the third heat spreader component 434 is disposed within the unibody enclosure 204, as represented by 1202, and secured into place using screws 1204(1)-(4). For instance, the third heat spreader component 434 can attach to the midframe 422 using four screws 1204(1)-(4). In some instances, more or less screws may be used to secure the third heat spreader component 434 to the midframe 422. Additionally, in some instances, an additional connection mechanism may be used to secure the third heat spreader component 434 to the midframe 422, such as an adhesive, one or more clamps, or the like.

Figure 13:
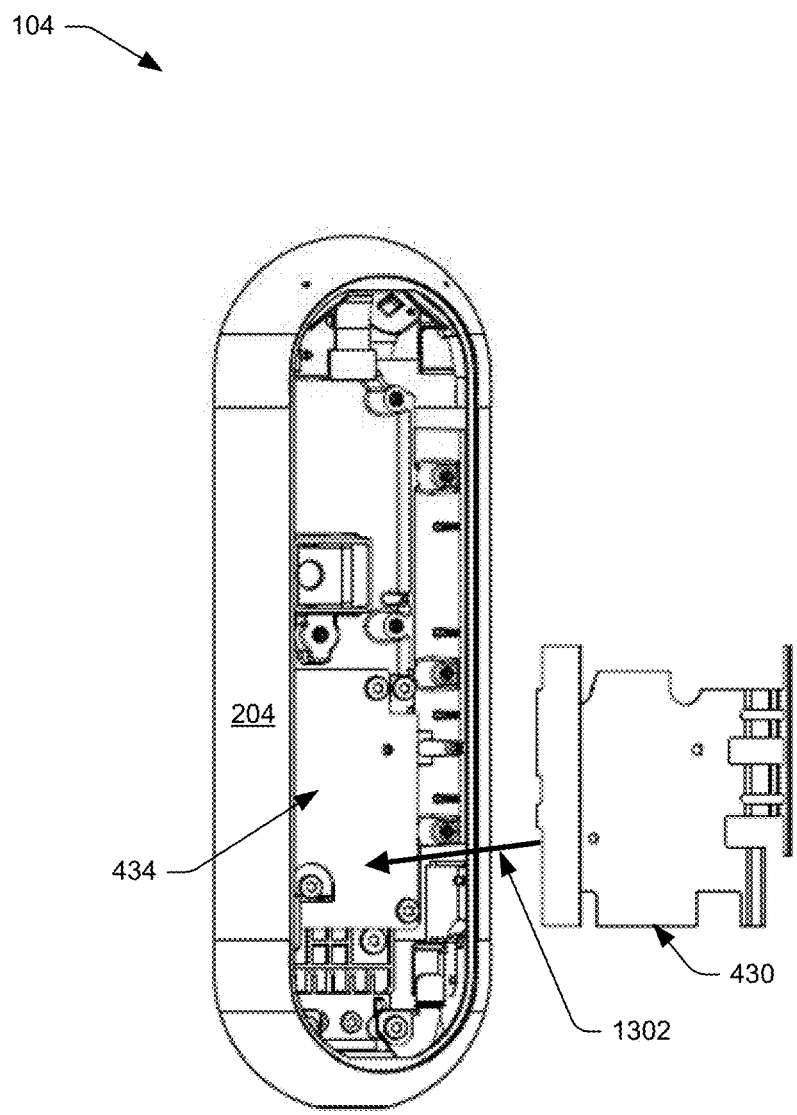
FIG. 13 illustrates an example of disposing a heat spreader within an electronic device.

FIG. 13 illustrates an example of disposing the first heat spreader component 430 within the electronic device 104. As discussed above, the first heat spreader component 430 can include a copper tape that takes heat from the third heat spreader component 434 and spreads the heat to the walls of the unibody enclosure 204. As such, the first heat spreader component 430 can be disposed on the third head spreader component within the unibody enclosure 204. In some instances, the first heat spreader component 430 is secured to the third heat spreader component 434 using an adhesive. Additionally, or alternatively, in some instances, an additional connection mechanism may be used to secure the first heat spreader component 430 to the third heat spreader component 434, such as one or more screws, one or more clamps, or the like.

Figure 14:
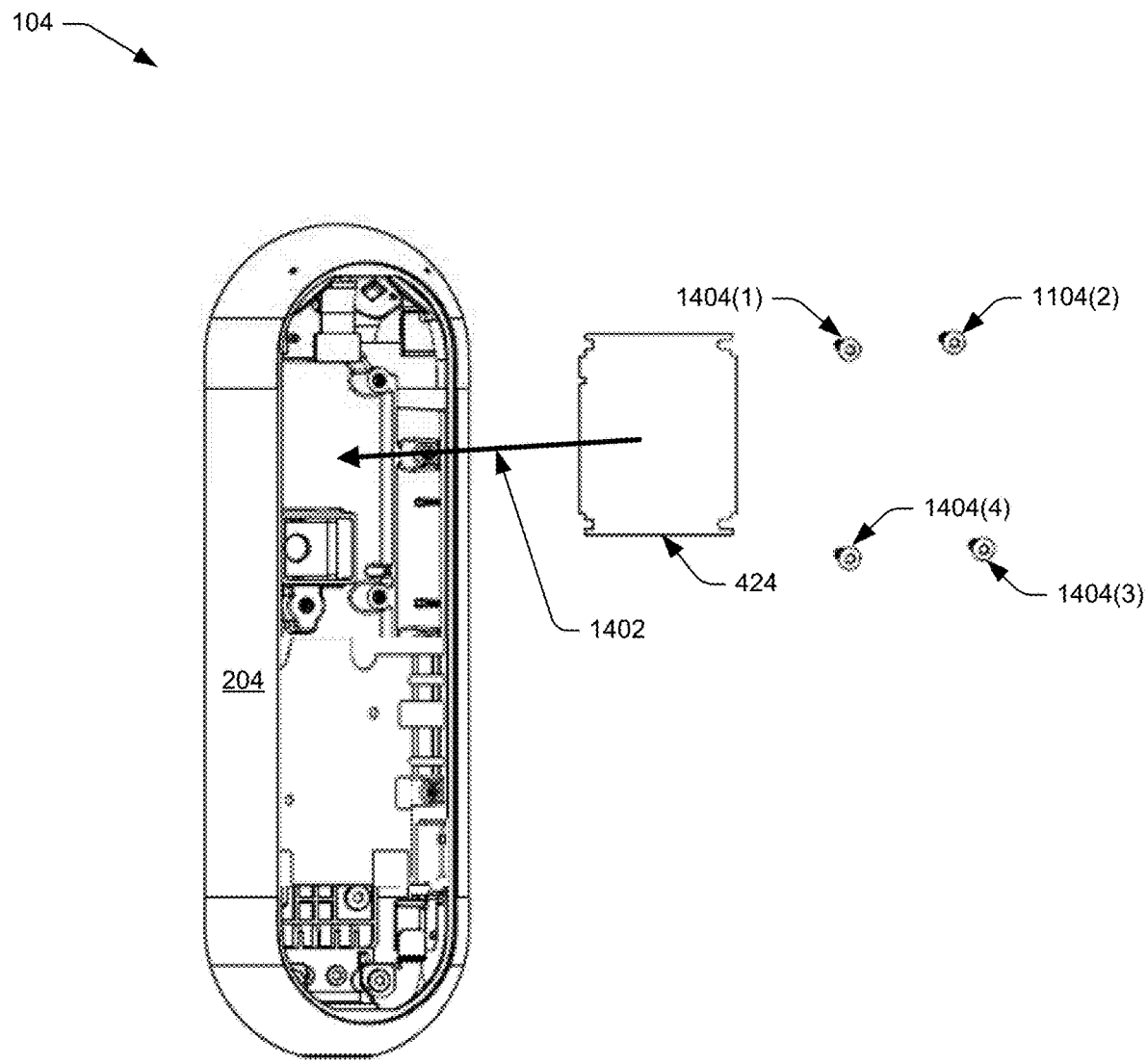
FIG. 14 illustrates an example of disposing a power entry printed circuit board assembly within an electronic device.

FIG. 14 illustrates an example of disposing the power entry PCB assembly 424 within the electronic device 104. As shown, the power entry PCB assembly 424 is disposed within the unibody enclosure 204, as represented by 1402, and secured into place using four screws 1404(1)-(4). For instance, the power entry PCB assembly 424 can attach to the midframe 422 using the four screws 1106(1)-(4). In some instances, more or less screws may be used to secure the power entry PCB assembly 424 to the midframe 422. Additionally, in some instances, an additional connection mechanism may be used to secure the power entry PCB assembly 424 to the midframe 422, such as an adhesive, one or more clamps, or the like.

In some instances, after the power entry PCB assembly 424 is disposed within the electronic device 104, a lighting apparatus FPC (not shown) of the electronic device 104 is disposed onto the power entry PCB assembly 424. Additionally, the lighting PCB assembly 438 (not shown) is disposed onto the power entry PCB assembly 424. The lighting PCB assembly 438 is then mechanically attached to the lighting apparatus FPC.

Figure 15:
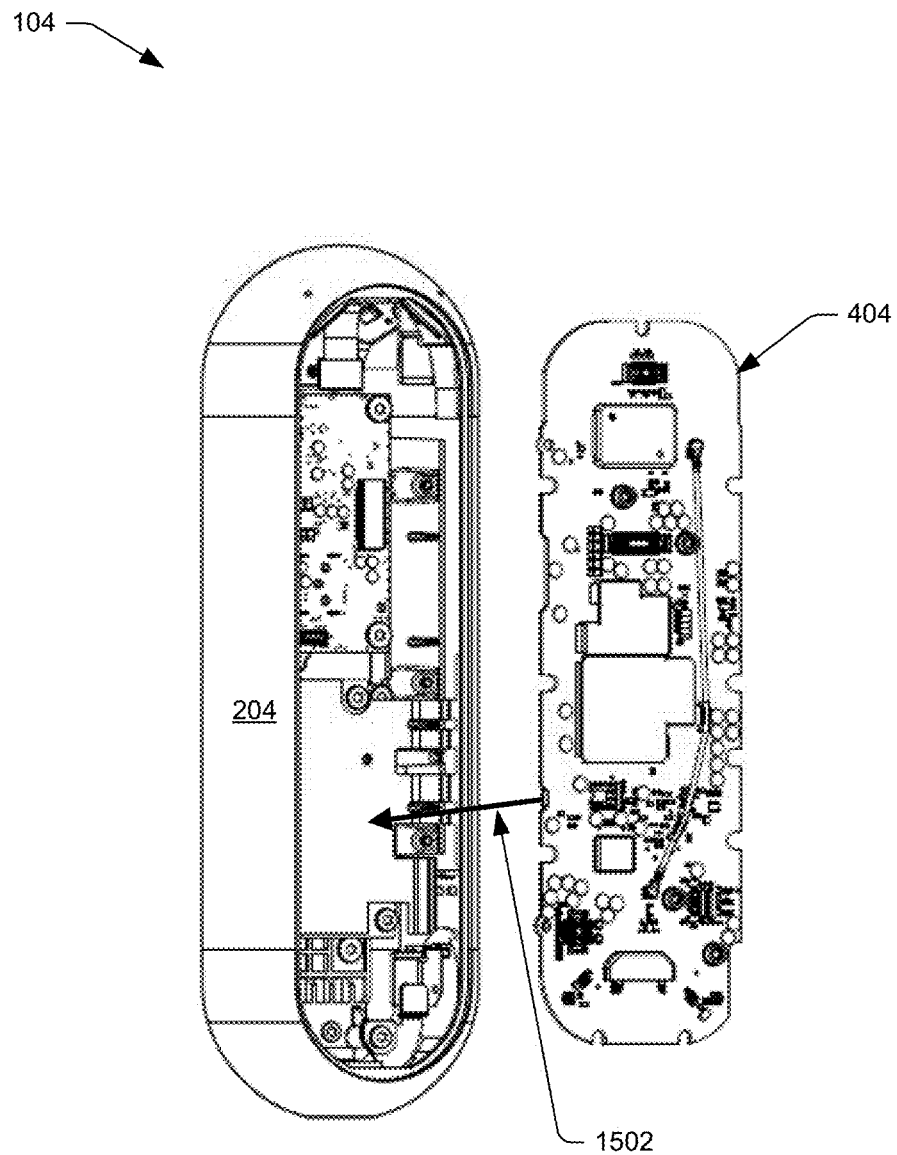
FIG. 15 illustrates an example of disposing a main printed circuit board assembly within an electronic device.

FIG. 15 illustrates an example of disposing the main PCB assembly 404 within the electronic device 104, as represented by 1502. As shown, the main PCB assembly 404 is disposed within the unibody enclosure 204, as represented by 1502. In some instances, the main PCB assembly 404 attaches to the side frame 420 using a pin that slides into a slot of the side frame 420. In some instances, a spacer block (not shown) is disposed on the top edge of the main PCB assembly 404 and/or the bottom edge of the main PCB assembly 404 in order to secure the main PCB 404 within the unibody enclosure 204. As discussed below with regard to FIG. 17, the main PCB assembly 404 is later attached to the side frame 420 and the midframe 422 using one or more screws.

Figure 16:
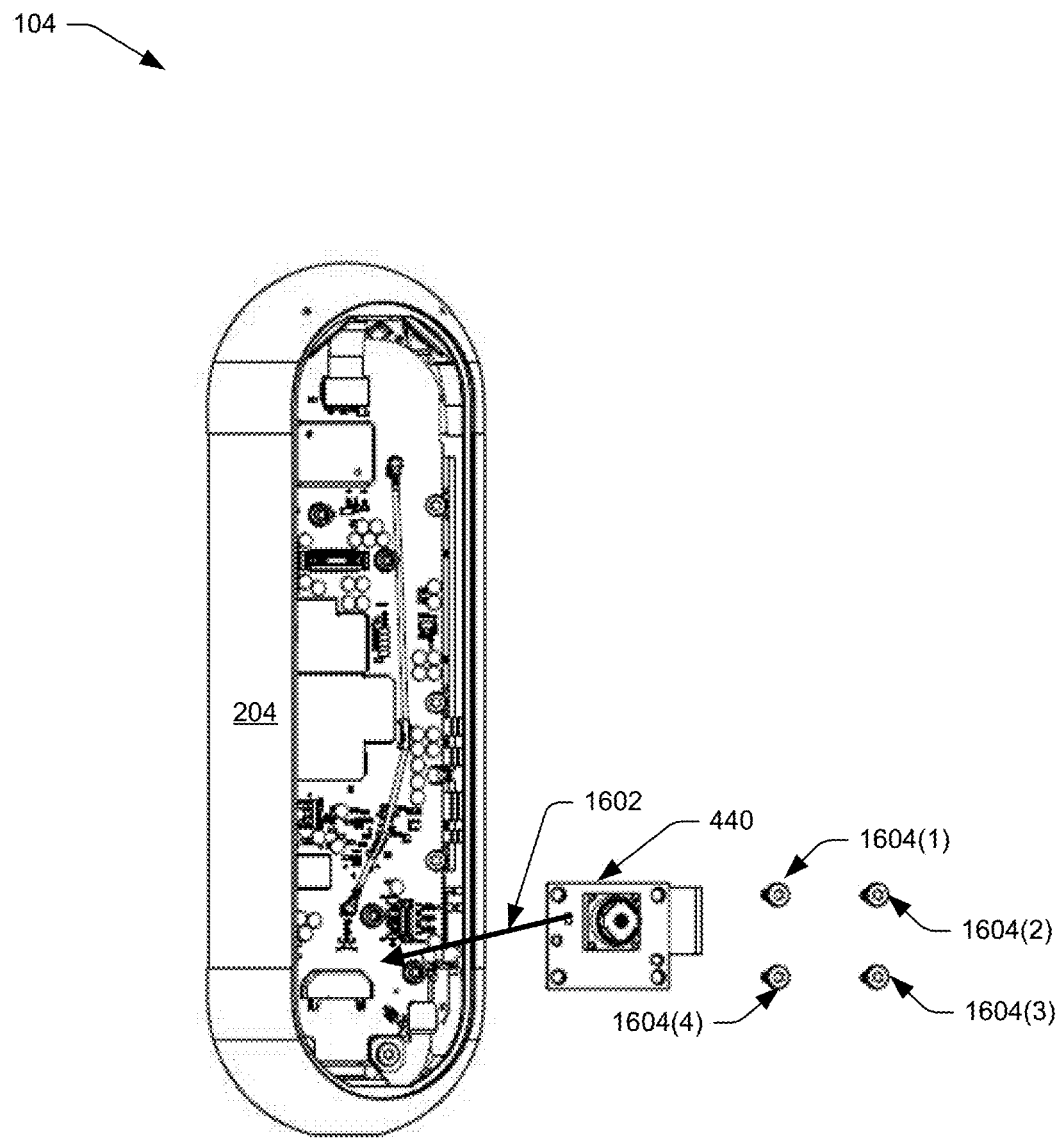
FIG. 16 illustrates an example of disposing a camera within an electronic device.

FIG. 16 illustrates an example of disposing the camera 440 within the electronic device 104. As shown, the camera 440 is disposed within the unibody enclosure 204, as represented by 1602, such that the camera 440 is connected to the main PCB assembly 404. In some instances, the camera 440 is secured within the unibody enclosure 204 by screwing the camera 440 to a metal bracket using screws 1604(1)-(4). In some instances, to ensure that the camera 440 is aligned properly, the camera 440 is aligned within the unibody enclosure 204 using a pin that is located on the camera 440 and a slot that is located on the main PCB assembly 404.

In some instances, in order to ensure that the camera 440 stays connected to the main PCB assembly 404, the electronic device 104 further includes a bracket (not shown) that is attached to the main PCB assembly 404 that secures the camera 440 in place. For instance, the bracket can be screwed to the main PCB assembly 404 at two different locations around the camera 440. In some instances, the locations include above the camera 440 and below the camera 440 with respect the longitudinal axis of the electronic device 104. In other instances, the locations can additionally and/or optionally include to the left and/or right of the camera 440 with respect to the horizontal axis of the electronic device 104.

In some instances, the camera 440 can be secured within the unibody enclosure 204 using one or more additional or alternative connection mechanisms. For instance, in addition to, or alternatively from the screws 1604(1)-(4), the camera 440 can be secured into the unibody enclosure 204 using an adhesive, one or more clips, or the like. Additionally, in some instances, the camera 440 can be secured within the unibody enclosure 204 using more or less than the four screws 1604(1)-(4) illustrated in FIG. 16.

FIG. 17 illustrates an example of disposing the middle bracket sub-assembly 702 within the electronic device 104. As shown, the middle bracket sub-assembly 702 is disposed within the unibody enclosure 204, as represented by 1702. In some instances, the middle bracket sub-assembly 702 (and similarly the depth sensing unit 442) is disposed within the unibody enclave 204 along the longitudinal axis of the housing 202. For instance, as shown, the longitudinal axis 1704 of the middle bracket sub-assembly 702 may be parallel with the longitudinal axis of the unibody enclosure 204. In some instances, to place the middle bracket sub-assembly 702 within the unibody enclosure 204, the middle bracket sub-assembly 702 is rotated into position such that a portion of the middle bracket sub-assembly 702 is located between the camera 440 and the main PCB assembly 404 (e.g., see FIG. 5).

The middle bracket sub-assembly 702 and the main PCB assembly 404 are then attached to the side frame 420 and the midframe 422 using six screws 704(1)-(6). However, in other instances, the middle bracket sub-assembly 702 and the main PCB assembly 404 may be secured within the unibody enclosure 204 using one or more other connection mechanisms, such as an adhesive or one or more clips. In some instances, the electronic device 104 includes a depth sensor bracket (not shown) that secures the camera 440 and/or the depth sensing unit 442 into place.

Figure 18:
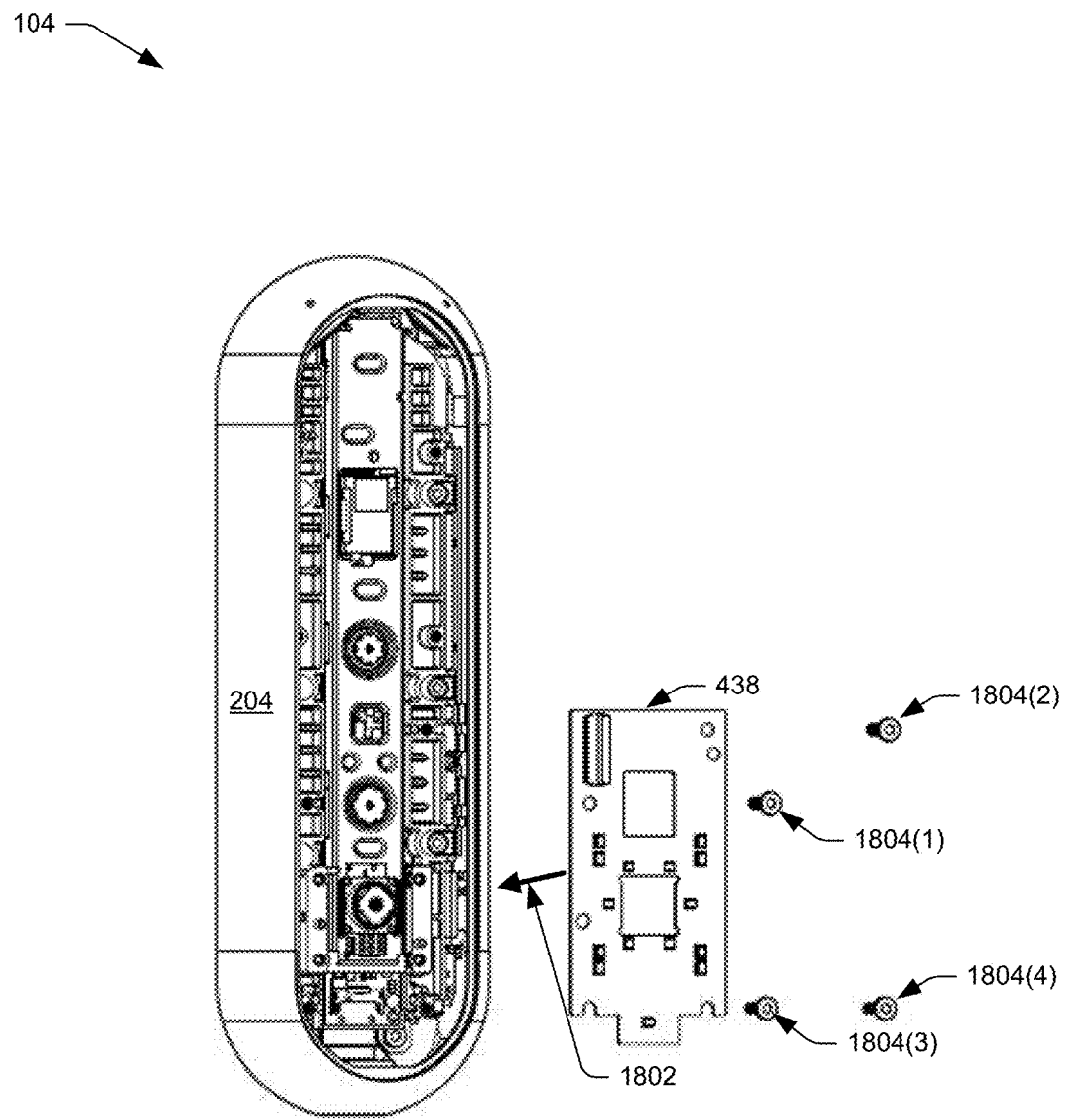
FIG. 18 illustrates an example of disposing a lighting printed circuit board assembly within an electronic device.

FIG. 18 illustrates an example of disposing the lighting PCB assembly 438 within the electronic device 104. As shown, the lighting PCB assembly 438 is disposed within the unibody enclosure 204, as represented by 1802, and then secured into place using screws 1804(1)-(4). In some instances, the lighting PCB assembly 438 is attached to the middle bracket sub-assembly 702. Additionally, or alternatively, in some instances, the lighting PCB assembly 438 is attached to one or more other components of within the unibody enclosure 204.

In some instances, the lighting PCB assembly 438 can be secured within the unibody enclosure 204 using one or more additional or alternative connection mechanisms. For instance, in addition to, or alternatively from, the screws 1804(1)-(4), the lighting PCB assembly 438 can be secured within the unibody enclosure 204 using an adhesive, one or more clips, or the like. Additionally, in some instances, the lighting PCB assembly 438 can be secured within the unibody enclosure 204 using more or less than the four screws 1804(1)-(4) illustrated in FIG. 18.

Figure 19:
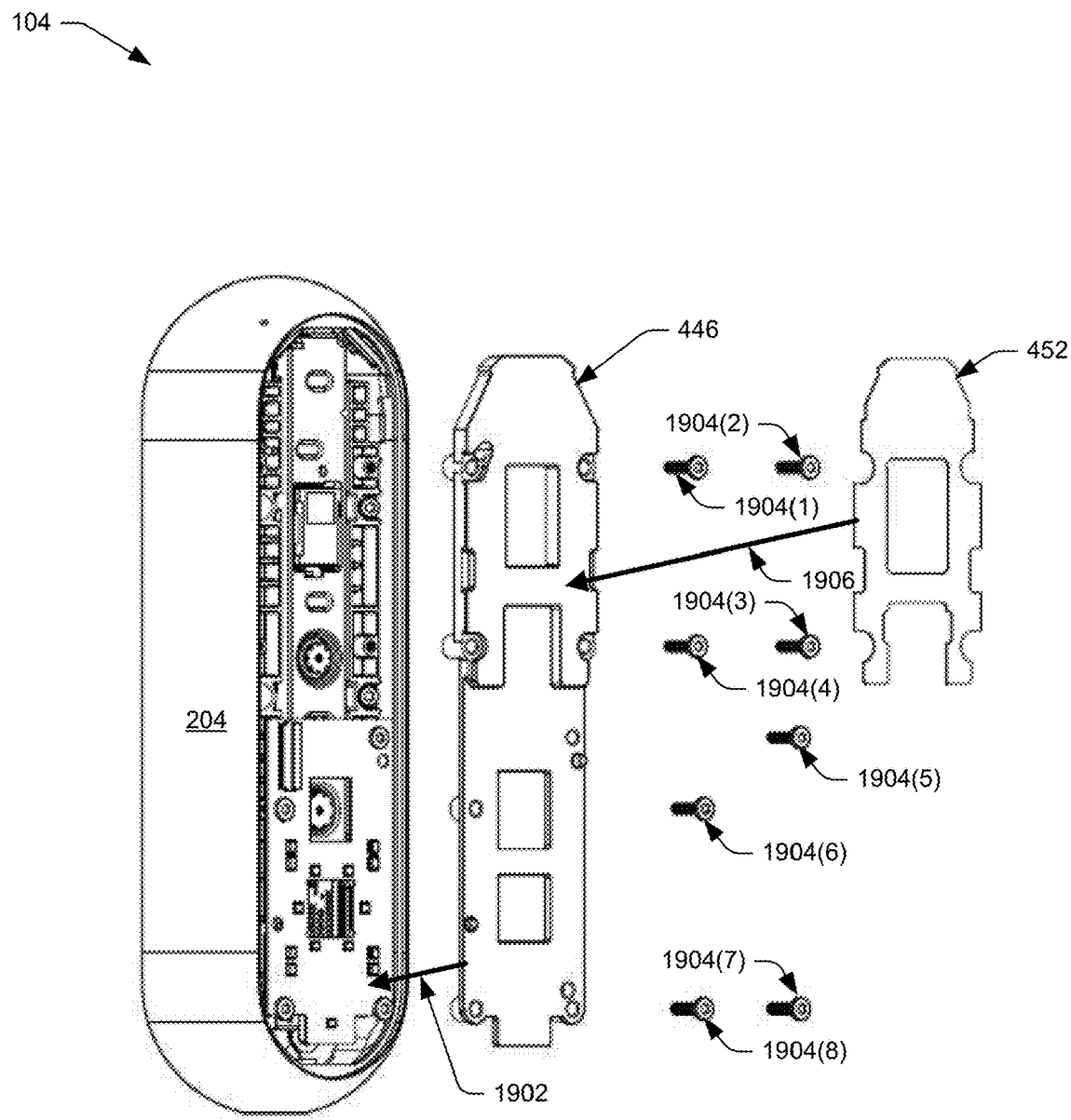
FIG. 19 illustrates an example of disposing a backer component within the electronic device.

FIG. 19 illustrates an example of disposing the backer component 446 within the electronic device 104. As shown, the backer component 446 is disposed within the unibody enclosure 204, as represented by 1902, and then secured into place using screws 1904(1)-(8). In some instances, the screws 1904(1)-(8) attach the backer component 446 to the middle bracket sub-assembly 702. Additionally, or alternatively, in some instances, the backer component 446 is attached to one or more other components within the unibody enclosure 204.

In some instances, the backer component 446 can be secured within the unibody enclosure 204 using one or more additional or alternative connection mechanisms. For instance, in addition to, or alternatively from, the screws 1904(1)-(8), the backer component 446 can be secured within the unibody enclosure 204 using an adhesive, one or more clips, or the like. Additionally, in some instances, the backer component 446 can be secured within the unibody enclosure 204 using more or less than the eight screws 1904(1)-(8) illustrated in FIG. 19.

As also illustrated in FIG. 19, the third seal component 452 is disposed with the unibody enclosure 204, as represented by 1906, and attached to the backer component 4446. As discussed above, in some instances, the third seal component 452 can include an adhesive that securely attaches the third seal component 452 to the backer component 466. In some instances, the third seal component 452 can attach to the backer component 466 using one or more additional or alternatively connection mechanisms.

Figure 20:
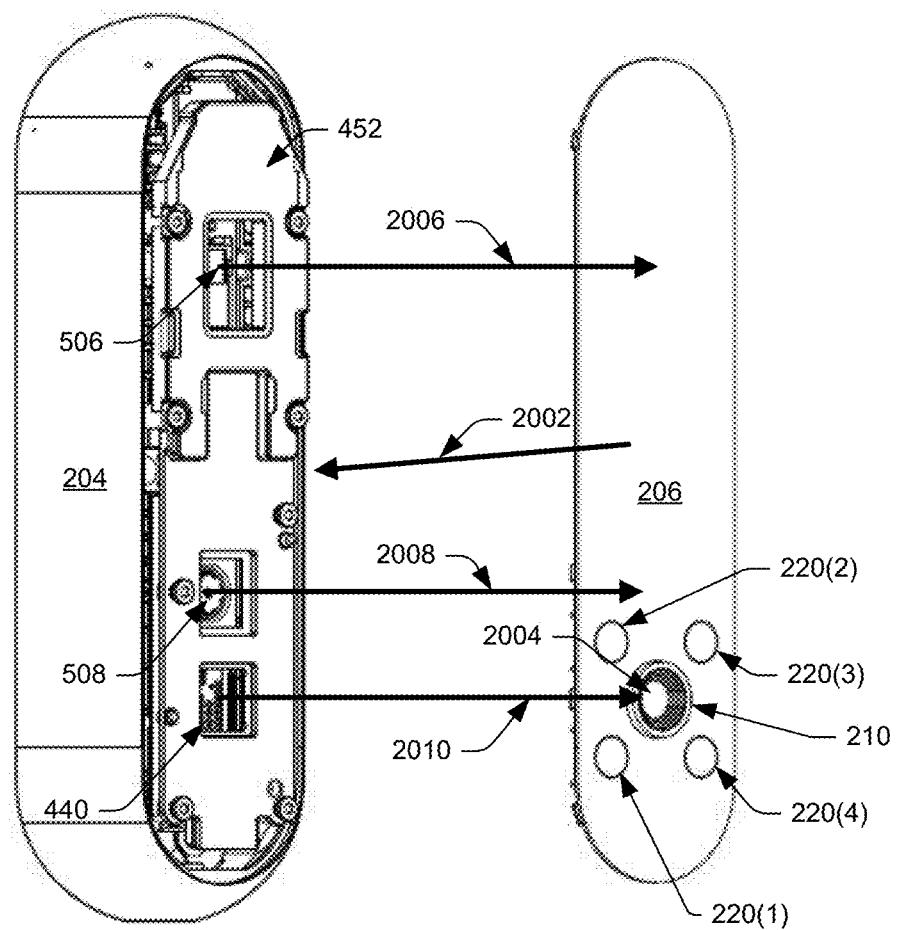
FIG. 20 illustrates an example of disposing a cover assembly on a unibody enclosure.

FIG. 20 illustrates an example of disposing the cover assembly 206 on the unibody enclosure 204. In some instances, the cover assembly 206 can snap within an undercut of the unibody enclosure 204, which is represented by 2002. This is to ensure that light that is emitted from outside of the electronic device 104 cannot enter within the housing 202 through the seal between the cover assembly 206 and the unibody enclosure 204. Additionally, or alternatively, in some instances, an adhesive can be disposed around a portion of, or an entirety of, the perimeter of the cover assembly 206 that contacts the unibody enclosure 204. Additionally, or alternatively, in some instances, the cover assembly 206 can be attached to the unibody enclosure 204 using one or more other connection mechanisms, such as screws, pins, or the like.

In some instances, a coating is disposed on an outer surface of the cover assembly 206 (e.g., the surface outside of the housing 202). The coating can protect the cover assembly 206 from damage, such as scratching or cracking. In some instances, and as illustrated in FIG. 20, the third seal component 452 can be disposed between the cover assembly 206 and the components within the unibody enclosure 204 to further secure the cover assembly 206 to the unibody enclosure 204. For instance, the cover assembly 452 can include an adhesive that secures further secures the cover assembly 206 to the unibody enclosure 204.

In some instances, a transparent component 2004 is disposed on the cover element 210. For instance, the transparent component 2004 can be attached to one end of the cover element 210 (e.g., the end of the cover element 210 that is positioned towards the unibody enclosure 204). In some instances, the camera 440 is directed at the transparent component 2004 and as such, can capture image data through the transparent component 2004. In some instances, the transparent component 2004 is the lens of the camera 440. The cover component 2004 can include glass, clear plastic, or any other material that allows light to pass through the cover assembly 210.

Figure 21:
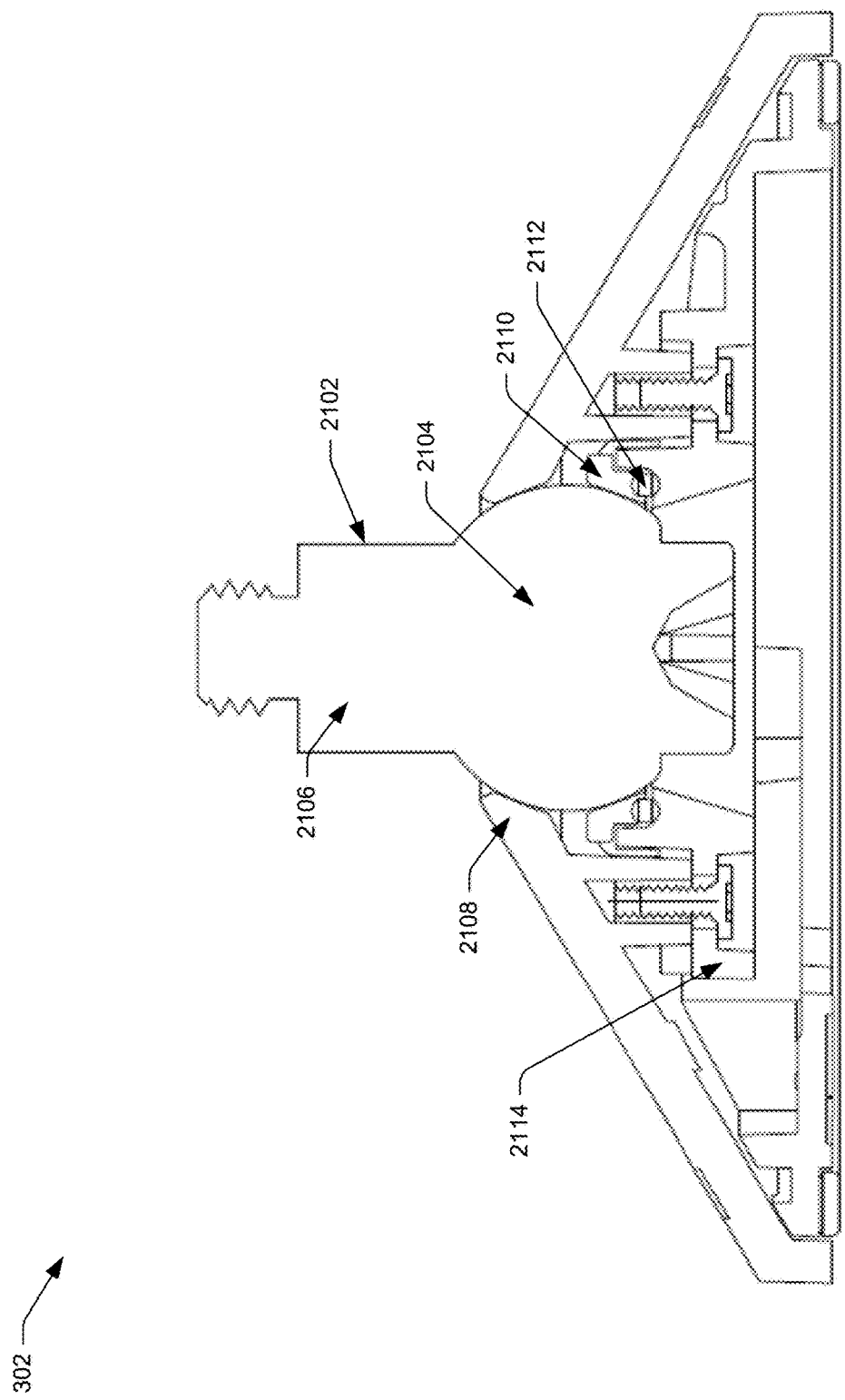
FIG. 21 illustrates an example of a mounting component for an electronic device.

As shown in FIG. 21, the depth sensing unit 442 is oriented within the housing 202 such that the depth sensing unit 442 is directed substantially in a direction of (e.g., substantially perpendicular to) the cover assembly 206 when the cover assembly 206 is attached to the unibody enclosure 204. For instance, the emitter 506 is oriented within the housing 202 such that the emitter 506 is directed (illustrated as 2006) substantially towards the cover assembly 206. Additionally, the receiver 508 is oriented within the housing 202 such that the receiver 508 is directed (illustrated as 2008) substantially towards the cover assembly 206. In some instances, each of the emitter 506 and the receiver 508 point in a direction that is substantially perpendicular to the surface of the cover assembly 206. As discussed above, in some instances, the cover assembly 206 can be translucent and as such, the depth sensing unit 442 can capture image data through the cover assembly.

Additionally, and as also shown in FIG. 21, the camera 440 is oriented within the housing 202 such that the camera 440 is directed (illustrated as 2010) substantially towards the transparent component 2004 when the cover assembly 206 is attached to the unibody enclave 204. For instance, the camera 440 can point in a direction that is substantially perpendicular to the surface of the cover assembly 206. Additionally, in some instances, since the cover element 210 protrudes from the surface of the cover assembly 206, the cover element 210 is capable of blocking light that is emitted by the electronic device 104 and reflected towards the camera 440.

FIG. 21 illustrates an example of the mounting component 302 for the electronic device 104. As shown, the mounting component 302 includes a gimbal 2102 that includes a ball joint 2104. In some instances, the gimbal 2102 can include a metal material while in other instances, the gimbal 2102 can include a different type material (e.g., plastic). On the bottom of the gimbal 2102, the mounting component 302 includes a recess that the user 102 can use to tighten and/or loosen the mounting component 302 to the electronic device 104. Additionally, the gimbal 2102 includes an extension component 2106 that is located above the ball joint 2104. The extension component 2106 can cause the housing 202 of the electronic device 104 to be located a given distance above a horizontal surface when the mounting component 302 is attached to the end of the electronic device 104.

In some instances, the bearing surfaces that are in contact with the ball joint 2104 include flat surface. By using flat surfaces, the ball joint 2104 may only include one ring of contact at a top portion of the ball and one ring of contact at a bottom portion of the ball. For instance, the mounting component 302 includes a top socket 2108. In some instances, the top socket 2108 can include a first bearing surface for the gimbal 2102. In some instances, the top socket 2108 can include plastic, such as acrylonitrile butadiene styrene (ABS) plastic. In other instances, the top socket 2108 can include a different type of material, such as metal.

The mounting component 302 further includes a delrin ring 2110. In some instances, the delrin ring 2110 can include a second bearing surface for the gimbal 2102. For instance, the top socket 2108 can include the bearing surface for the top portion of the gimbal 2102 and the delrin ring 2110 can include the bearing surface for the bottom portion of the gimbal 2102. In some instance, a force, such as a spring force, can be applied to the delrin ring 2110 by a gasket 2112. In some instances, the gasket 2112 can include a silicon rubber gasket. In other instances, the gasket 2112 can include any type of gasket that applies a force to the delrin ring 2110.

The mounting component 302 further includes a bottom socket 2114 that is attached to the top socket 2108. In some instances, the bottom socket 2114 attaches to the top socket 2108 using four screws. The bottom socket 2114 can help balance a load that is applied to the delrin ring 2110.

In some instances, the mounting component 302 can include an angle control component. The angle control component can limit the rotation of the gimbal 2102 to a given range of rotation. For instance, the angle control component can limit the rotation of the gimbal 2102 to +/−15 degrees. However, in other instances, the angle component can limit the rotation of the gimbal 2102 to any range of rotation.

Figure 22A:
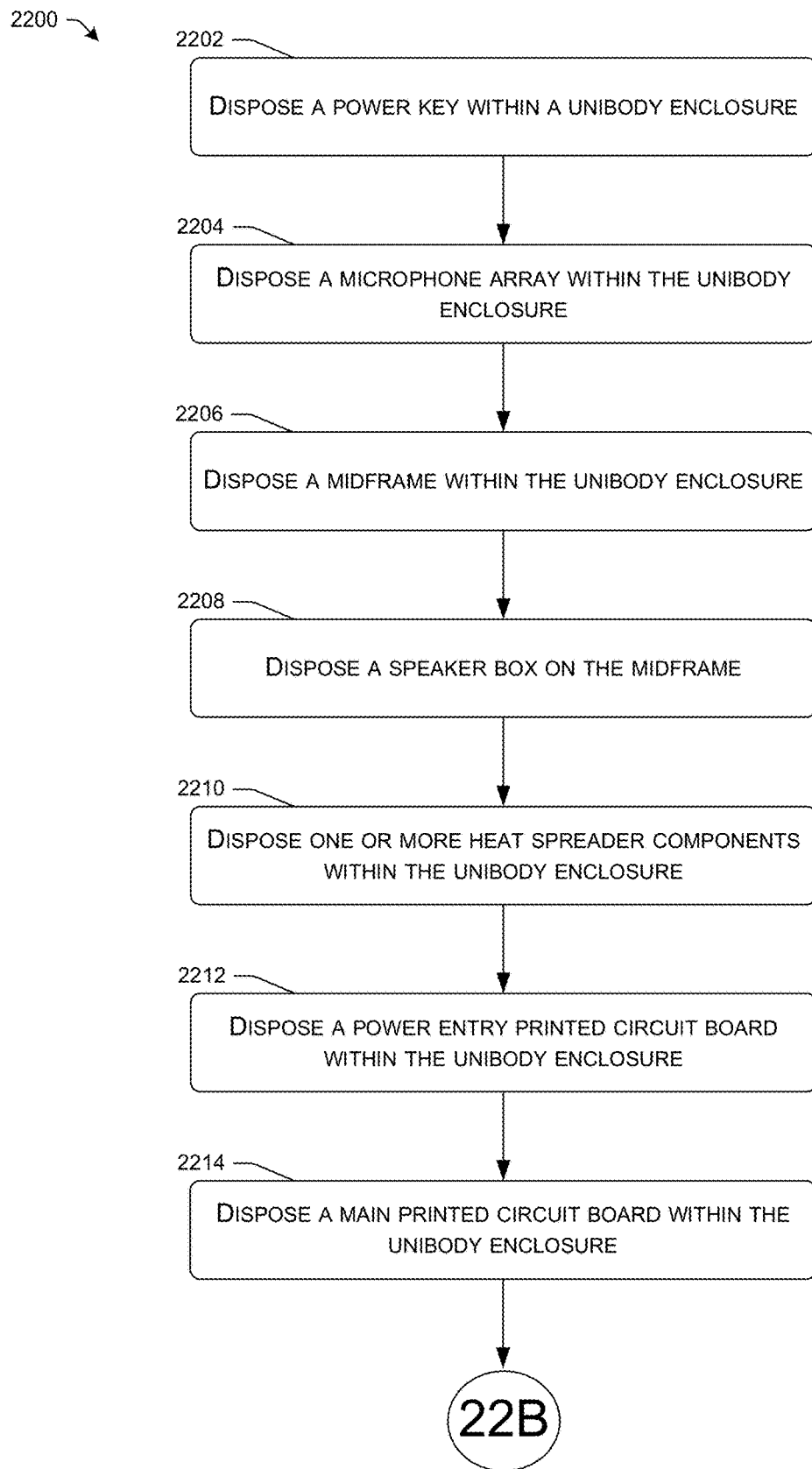
FIGS. 22A-22B illustrate an example process for assembling an electronic device.
Figure 22B:
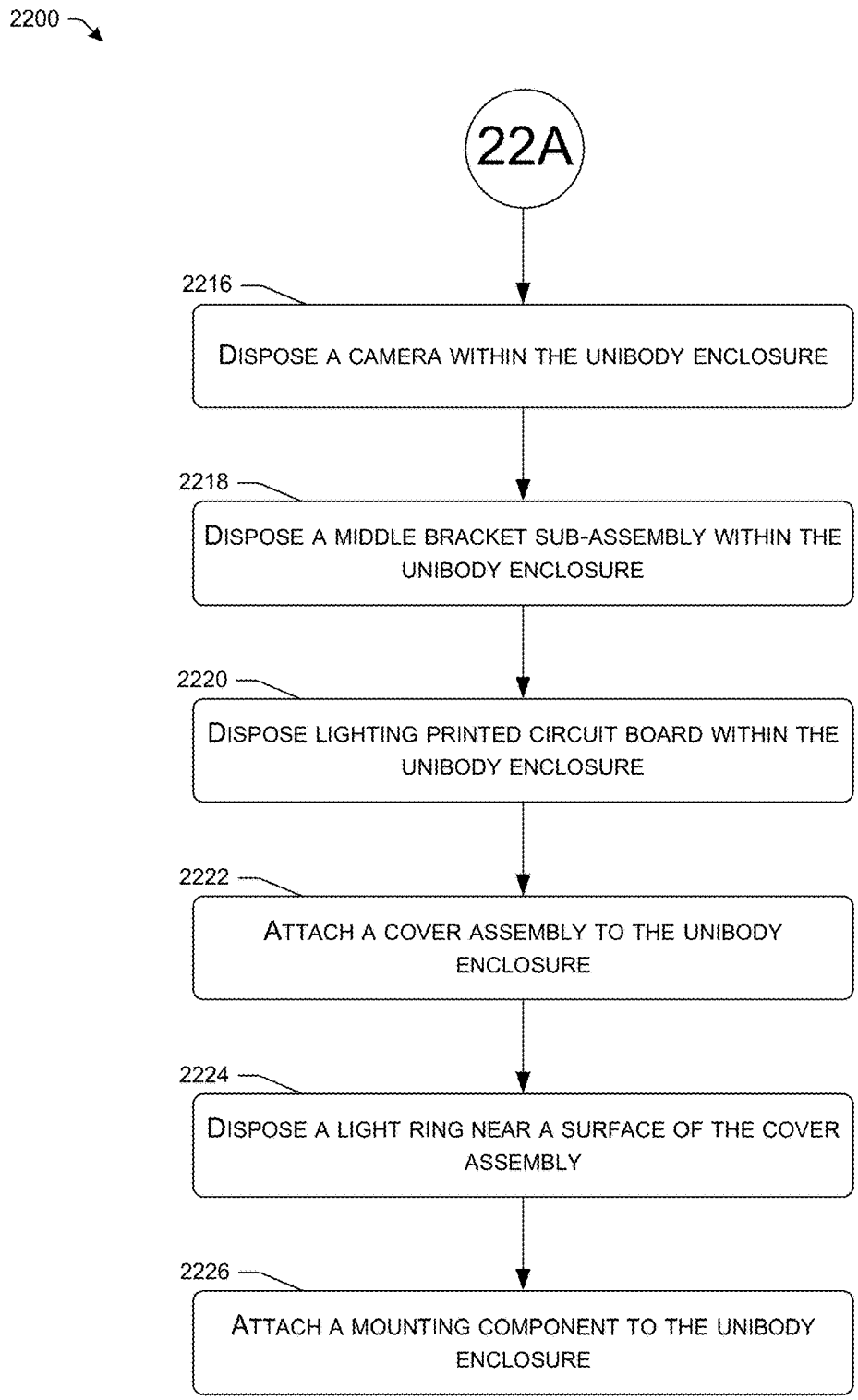

FIGS. 22A-22B illustrate an example process 2200 for assembling an electronic device. The order in which the operations are described is not intended to be construed as a limitation, and any number of the described blocks can be combined in any order and/or in parallel to implement the process. Additionally, any number of the described blocks can be optional and eliminated to implement the process.

At 2202, the process 2200 disposes a power key within a unibody enclosure. For instance, a multipurpose controller may be disposed within an opening that is located near a first end of the unibody enclosure. In some instances, the first end can include a bottom end of the unibody enclosure when the electronic device is oriented longitudinally. A button carrier can then be disposed within the unibody enclosure, proximate to the multipurpose controller, in order to secure the multipurpose controller to the first end of the unibody enclosure.

At 2204, the process 2200 disposes a microphone array within the unibody enclosure. For instance, the microphone array may be disposed at a second end within the unibody enclosure. In some instances, the second end can include a top end of the unibody enclosure when the electronic device is oriented longitudinally. In some instances, the microphone array may include one or more microphones that capture sound that travels from outside of the electronic device to within the electronic device through one or more opening located at the first end of the unibody enclosure.

At 2206, the process 2200 includes disposing a midframe within the unibody enclosure and at 2208, the process 2200 include disposing a speaker box on the midframe. For instance, the midframe may be disposed along the longitudinal axis of the unibody enclosure when the electronic device is oriented longitudinally. In some instance, a side frame may then be disposed within the unibody enclosure and attached to the midframe. The speaker box is then disposed to the midframe. In some instances, the speaker box includes one or more speakers for outputting sound through one or more opening located on a back surface of the unibody enclosure.

At 2210, the process 2200 disposes one or more heat spreader components within the unibody enclosure. For instance, one or more heat spreaders can be disposed within the unibody enclosure that take heat that is generated by at least a power entry PCB assembly and a main PCB assembly and transfer the heat to the walls of the unibody enclosure. In some instances, the one or more heat spreader components can include copper while in other instances, at least one of the one or more heat spreader components can include a different material that is capable to spreading the heat from within the unibody enclosure to the walls of the unibody enclosure.

At 2212, the process 2200 disposes a power entry printed circuit board within the unibody enclosure. For instance, a power entry PCB assembly can be disposed within the unibody enclosure and attached to the midframe. In some instances, a lighting apparatus FCB can then be disposed within the unibody enclosure and electrically connected to the power entry PCB assembly.

At 2214, the process 2200 disposes a main printed circuit board within the unibody enclosure. For instance, a main PCB assembly can be disposed within the unibody enclosure and aligned using a pin that slides into a slot of the side frame. In some instances, one or more spacer blocks are disposed at a top edge and/or a bottom edge of the main PCB assembly in order to secure the main PCB assembly in place. The main PCB assembly is then attached to the midframe using one or more connection mechanisms, such as one or more screws.

At 2216, the process 2200 disposes a camera within the unibody enclosure. For instance, the camera can be disposed within the unibody enclosure such that a portion of a FPC of the camera attaches to the main PCB assembly. In some instances, the camera is aligned within the unibody enclosure using a pin and a slot. In some instances, a bracket is then disposed within the unibody enclosure in order to secure a portion of the camera to the main PCB assembly. For instance, the bracket can attach to the main PCB assembly at two or more locations around the camera.

At 2218, the process 2200 disposes a middle bracket sub-assembly within the unibody enclosure. For instance, the middle bracket sub-assembly can be disposed within the unibody enclosure by rotating the middle bracket sub-assembly such that a portion of the middle bracket sub-assembly is disposed between the main PCB assembly and the camera. As discussed above, the middle bracket sub-assembly can include at least a chassis and a depth sensing unit. By disposing at least a portion of the middle bracket sub-assembly between the main PCB assembly and the camera, the camera is aligned with the emitter and the receiver of the depth sensing unit.

At 2220, the process 2200 disposes a lighting printed circuit board within the unibody enclosure. For instance, a lighting PCB assembly can be disposed within the unibody enclosure and attached to the middle bracket sub-assembly. The lighting PCB assembly can include one or more lighting elements that emit light when a user interacts with the electronic device.

At 2222, the process 2200 attaches a cover assembly to the unibody enclosure. For instance, the cover assembly can attach to the unibody enclosure by snapping within an undercut of the unibody enclosure. In some instances, once attached to the unibody enclosure, the depth sensing unit (e.g., the emitter and the receiver) and the camera substantially point in a direction of the cover assembly. For instance, the cover assembly can include a translucent material that allows the light from the emitter to travel from within the housing of the electronic device to outside of the housing of the electronic device. Additionally, the translucent material can allow the receiver to capture light that travels from outside of the housing to within the housing. The cover assembly can further include a transparent component for the camera.

At 2224, the process 2200 disposes a light ring near a surface of the cover assembly. For instance, the cover assembly can include a cover element that protrudes from a surface of the cover assembly. In some instances, the surface can include the surface of the cover assembly that is directed away from the unibody enclosure. The cover element can include a light ring that diffuses light emitting from one or more lighting elements.

At 2226, the process 2200 disposes a mounting component to the unibody enclosure. For instance, the mounting component can attach to the first end of the unibody enclosure when the electronic device is placed on a surface that is substantially horizontal. Additionally, the mounting component can attach to a back surface of the unibody enclosure when the electronic device is attached to a substantially vertical surface. In some instances, the back surface of the unibody enclosure includes the surface that is directly opposite to the cover assembly.

Figure 23:
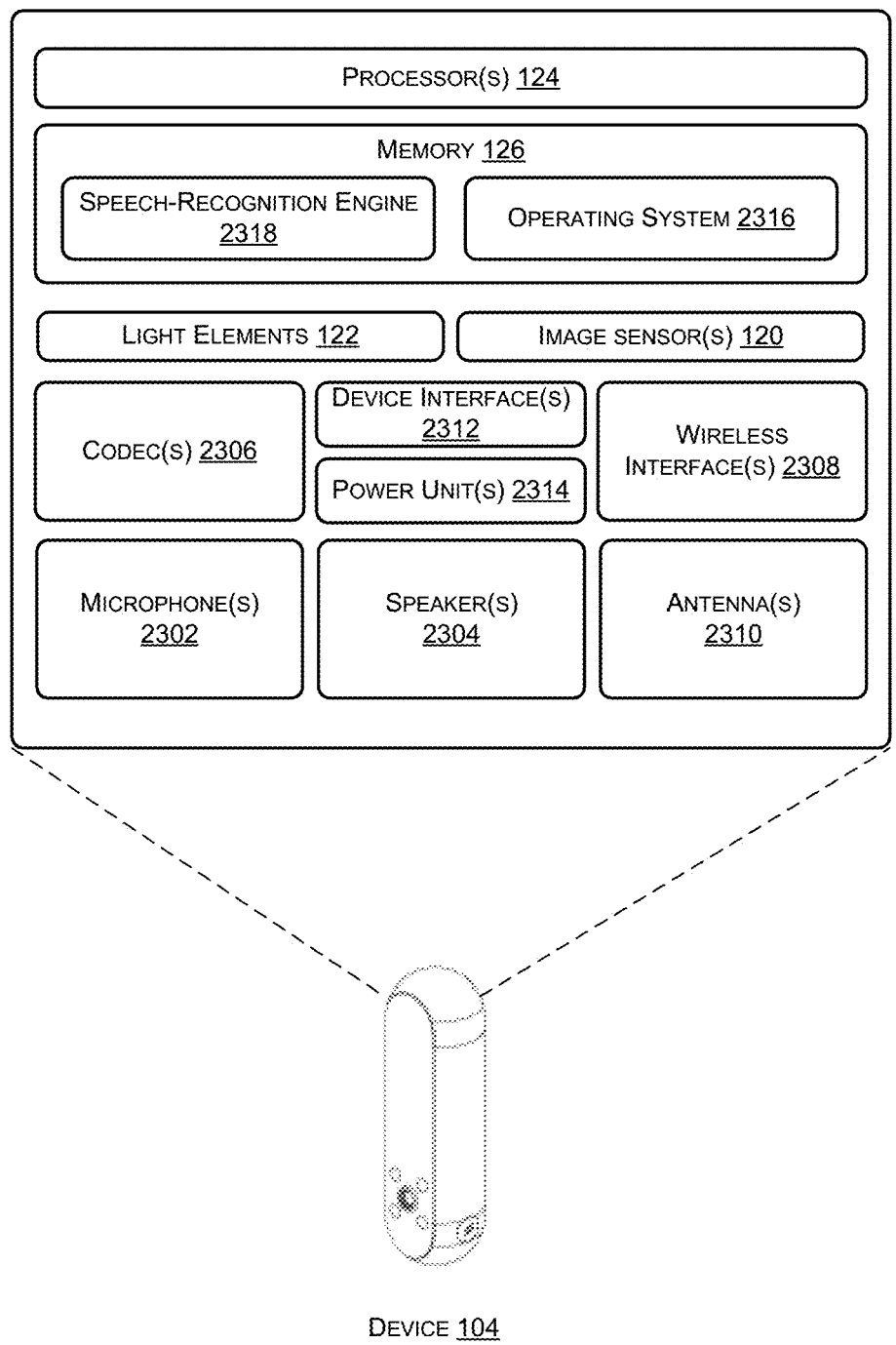
FIG. 23 illustrates a brick diagram of selected functional components implemented in an electronic device.

FIG. 23 illustrates a brick diagram of selected functional components implemented in the electronic device 104. Generally, the electronic device 104 may be implemented as a standalone device that is relatively simple in terms of functional capabilities with limited input/output components, memory and processing capabilities. For instance, the electronic device 104 does not have a keyboard, keypad, or other form of mechanical input in some implementations, nor does it have a display or touch screen to facilitate visual presentation and user touch input. Instead, the electronic device 104 may be implemented with the ability to receive and output audio, a network interface (wireless or wire-based), power, and limited processing/memory capabilities.

In the illustrated implementation, the electronic device 104 includes the processor(s) 124 and memory 126. The processor(s) 124 may include multiple processors and/or a processor having multiple cores. Further, the processor(s) 124 may comprise one or more cores of different types. For example, the processor(s) 124 may include application processor units, graphic processing units, and so forth. In one implementation, the processor(s) 124 may comprise a microcontroller and/or a microprocessor. The processor(s) 124 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 124 may possess its own local memory, which also may store program components, program data, and/or one or more operating systems.

The memory 126 may include volatile and nonvolatile memory, removable and non-removable media implemented in any method or technology for storage of information, such as computer-readable instructions, data structures, program component, or other data. Such memory 126 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 126 may be implemented as computer-readable storage media ("CRSM"), which may be any available physical media accessible by the processor(s) 124 to execute instructions stored on the memory 126. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

The electronic device 104 includes a microphone array that comprises one or more microphones 2302 to receive audio input, such as user voice input. The electronic device 104 also includes a speaker unit that includes one or more speakers 2304 to output audio sounds. The electronic device 104 also includes the lighting elements 122 (e.g., the light ring) and the image sensor(s) 120 (e.g., the depth sensor, the camera, etc.) described above.

One or more codecs 2306 are coupled to the microphone(s) 2302 and the speaker(s) 2304 to encode and/or decode the audio signals. The codec may convert audio data between analog and digital formats. A user may interact with the electronic device 104 by speaking to it, and the microphone(s) 2302 captures sound and generates an audio signal that includes the user speech. The codec(s) 2306 encode the user speech and transfers that audio data to other components. The electronic device 104 can communicate back to the user by emitting audible statements through the speaker(s) 2304. In this manner, the user interacts with the electronic device 104 simply through speech, without use of a keyboard or display common to other types of devices.

In the illustrated example, the electronic device 104 includes one or more wireless interfaces 2308 coupled to one or more antennas 2310 (e.g., FPC antennas) to facilitate a wireless connection to a network. The wireless interface(s) 2308 may implement one or more of various wireless technologies, such as Wi-Fi Bluetooth, RF, and so on.

In some instances, one or more device interfaces 2312 (e.g., USB, broadband connection, etc.) may further be provided as part of the electronic device 104 to facilitate a wired connection to a network, or a plug-in network device that communicates with other wireless networks. One or more power units 2314 are further provided to distribute power to the various components on the electronic device 104.

The electronic device 104 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the electronic device 104 may include non-input control mechanisms, such as basic volume control button(s) for increasing/decreasing volume, as well as power and reset buttons. There may also be one or more simple lighting elements (e.g., LEDs around perimeter of a top portion of the device) to indicate a state such as, for example, when power is on or to indicate when a command is received. But, otherwise, the electronic device 104 does not use or need to use any input devices or displays in some instances.

Several modules such as instruction, datastores, and so forth may be stored within the memory 126 and configured to execute on the processor(s) 124. An operating system module 2316 is configured to manage hardware and services (e.g., wireless unit, Codec, etc.) within and coupled to the electronic device 104 for the benefit of other modules. In addition, the memory 126 may include the speech-recognition engine 2318. The speech-recognition engine 2318 performs speech recognition on audio signals generated based on sound captured by the microphone, such as utterances spoken by the user 102.

Although the subject matter has been described in language specific to structural features, it is to be understood that the subject matter defined in the appended claims is not necessarily limited to the specific features described. Rather, the specific features are disclosed as illustrative forms of implementing the claims.

It is noted that, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device comprising:
a housing having a substantially cylindrical shape, a first end, and a second end, wherein at a least a portion of the housing comprises a translucent surface that includes an opening;
a microphone array disposed near the first end of the housing;
a midframe assembly disposed within the housing;
a printed circuit board assembly (PCBA) disposed within the housing, the PCBA including one or more processors and one or more computer-readable media;
one or more heat dissipation components disposed between the midframe assembly and the PCBA;
a depth sensing unit disposed within the housing substantially parallel to a longitudinal axis of the housing, wherein the depth sensing unit is directed substantially towards the translucent surface;
a camera disposed within the housing, wherein the camera is directed substantially towards the opening of the translucent surface; and
one or more lighting elements disposed near the translucent surface.

2. The electronic device as recited in claim 1, wherein the camera is disposed on the depth sensing unit and connected to the PCBA.

3. The electronic device as recited in claim 1, further comprising:
a cover element disposed on the translucent surface, the cover element including a circular shape,
wherein the one or more lighting elements include a light ring disposed at an end of the cover element.

4. The electronic device as recited in claim 3, wherein the cover element includes a transparent component surrounding the opening.

5. The electronic device as recited in claim 1, further comprising a mounting element disposed on at least one of:
a uniformly-shaped surface of the housing in order to dispose the electronic device on a vertical surface; or
the second end of the housing in order to dispose the electronic device on a horizontal surface.

6. The electronic device as recited in claim 1, further comprising a loudspeaker box disposed on the midframe assembly, the loudspeaker box including one or more loudspeakers.

7. The electronic device as recited in claim 1, wherein:
the housing further includes a first surface and a second surface, at least a portion of the first surface including the translucent surface;
the first end includes one or more openings located near the microphone array; and
the electronic device further comprises at least one loudspeaker, the at least one loudspeaker being directed substantially towards the second surface.

8. The electronic device as recited in claim 1, further comprising:
a lighting element; and
a lens, the lighting element being arranged within the housing and oriented to emit light from within the housing to outside the housing via the lens.

9. An electronic device comprising:
a housing of a substantially cylindrical shape that includes a translucent surface, the translucent surface including an opening;
a cover element extending from the translucent surface and encircling the opening;
at least one microphone disposed at an end of the housing;
at least one loudspeaker disposed within the housing;
a depth sensing unit disposed within the housing, wherein the depth sensing unit is directed substantially towards the translucent surface; and
a camera disposed within the housing, wherein the camera is directed substantially towards the opening.

10. The electronic device as recited in claim 9, further comprising a printed circuit board assembly disposed within the housing, wherein the camera is disposed on the depth sensing unit and connected to the printed circuit board assembly.

11. The electronic device as recited in claim 9, wherein the cover element includes:
one or more stairs; and
a light ring.

12. The electronic device as recited in claim 9, wherein the depth sensing unit includes at least an infrared emitter and an infrared receiver.

13. The electronic device as recited in claim 9, wherein the end comprises a first end, the electronic device further comprising a mounting component disposed on at least one of:
a second end of the housing in order to dispose the electronic device on a horizontal surface; or
an additional surface of the housing in order to dispose the electronic device on a vertical surface.

14. The electronic device as recited in claim 9, further comprising:
a loudspeaker box disposed within the housing, the loudspeaker box including the at least one loudspeaker;
a printed circuit board assembly disposed within the housing, the printed circuit board assembly including one or more processors and one or more computer-readable media; and
one or more heat dissipation components disposed between the loudspeaker box and the printed circuit board assembly.

15. The electronic device as recited in claim 9, wherein the translucent surface includes a flat surface and at least a portion of the housing includes a cylindrically-shaped surface.

16. A device comprising:
a housing having a first end and a second end, wherein at a least a portion of the housing comprises a translucent surface that includes an opening;

a microphone array disposed near the first end of the housing;
a frame disposed within the housing;
a printed circuit board (PCB) disposed within the housing;
one or more heat dissipation elements disposed between the frame and the PCB;
a depth sensing unit disposed within the housing and oriented substantially parallel to a longitudinal axis of the housing, wherein the depth sensing unit is directed substantially towards the translucent surface;
a camera directed substantially towards the opening of the translucent surface; and
a loudspeaker.

17. The device of claim 16, further comprising:
a cover element disposed on the translucent surface, the cover element including a circular shape; and
one or more lighting elements disposed at an end of the cover element.

18. The device of claim 16, further comprising a loudspeaker box disposed on the frame, wherein the loudspeaker is disposed within the loudspeaker box.

19. The device of claim 16, further comprising:
a transparent component attached to the translucent cover;
a cover element protruding from a surface of the translucent cover, the cover element including a circular shape that surrounds the transparent component; and
a light ring disposed on the cover element.

20. The device of claim 16, further comprising a mounting component disposed on the housing, wherein the mounting component is disposed on at least one of:
the second end of the housing to dispose the device on a horizontal surface; or
a surface of the housing, between the first end of the housing and the second end of the housing, to dispose the device on an additional vertical surface.

* * * * *